United States Patent
Wang et al.

(10) Patent No.: US 11,395,231 B2
(45) Date of Patent: Jul. 19, 2022

(54) METHODS AND APPARATUSES FOR CHANNEL ACCESS AND RECOVERY WAKE-UP RADIOS

(71) Applicant: INTERDIGITAL PATENT HOLDINGS, INC., Wilmington, DE (US)

(72) Inventors: Xiaofei Wang, Cedar Grove, NJ (US); Li-Hsiang Sun, San Diego, CA (US); Hanqing Lou, Syosset, NY (US); Oghenekome Oteri, San Diego, CA (US); Joseph S. Levy, Merrick, NY (US); Rui Yang, Greenlawn, NY (US); Alphan Sahin, Westbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/977,606

(22) PCT Filed: Mar. 4, 2019

(86) PCT No.: PCT/US2019/020548
§ 371 (c)(1),
(2) Date: Sep. 2, 2020

(87) PCT Pub. No.: WO2019/169387
PCT Pub. Date: Sep. 6, 2019

(65) Prior Publication Data
US 2020/0404589 A1    Dec. 24, 2020

Related U.S. Application Data

(60) Provisional application No. 62/637,747, filed on Mar. 2, 2018, provisional application No. 62/722,515, filed on Aug. 24, 2018.

(51) Int. Cl.
*H04W 52/02* (2009.01)

(52) U.S. Cl.
CPC ............................. *H04W 52/0235* (2013.01)

(58) Field of Classification Search
CPC ..................... H04W 52/0235; Y02D 30/70
(Continued)

(56) References Cited

U.S. PATENT DOCUMENTS

| | | | | |
|---|---|---|---|---|
| 2008/0205340 A1* | 8/2008 | Meylan | ................ | H04W 48/18 370/331 |
| 2013/0136018 A1* | 5/2013 | Jeong | ..................... | H04L 43/12 370/252 |

(Continued)

OTHER PUBLICATIONS

Aboul-Magd, "802.11 HEW SG Proposed PAR," IEEE 802.11-14/0165r0 (Jan. 22, 2014).
(Continued)

*Primary Examiner* — Tan H Trinh
(74) *Attorney, Agent, or Firm* — Volpe Koenig

(57) ABSTRACT

Methods and apparatuses are described herein for network discovery. A wireless transmit/receive unit (WTRU) may transmit, to a first access point (AP), via a Primary Connectivity Radio (PCR), a request indicating that on a condition that the WTRU is disassociated from the first AP, the WTRU will enter a wake-up radio (WUR) only discovery mode. The WTRU may receive, from the first AP, via the PCR, a management frame that has WUR discovery elements including an indication of at least one channel used by a second AP. The WTRU may perform disassociation from the first AP. The WTRU may activate a WUR and deactivate the PCR. On a condition that the WTRU is disassociated from the first AP, the WTRU may receive, from the second AP, via the WUR, a WUR frame over the at least one channel to enable the WTRU to activate the PCR to initiate association.

20 Claims, 23 Drawing Sheets

(58) Field of Classification Search
USPC .................................. 370/252, 331, 338
See application file for complete search history.

(56) References Cited

U.S. PATENT DOCUMENTS

| | | | | |
|---|---|---|---|---|
| 2014/0376392 | A1* | 12/2014 | Hegde | H04W 48/08 370/252 |
| 2015/0230161 | A1* | 8/2015 | Park | H04W 48/16 370/338 |
| 2017/0086251 | A1 | 3/2017 | Valliappan et al. | |
| 2017/0310370 | A1 | 10/2017 | Liu et al. | |
| 2018/0376419 | A1* | 12/2018 | Li | H04W 52/0229 |
| 2019/0028967 | A1* | 1/2019 | Ahn | H04B 7/02 |
| 2019/0082390 | A1* | 3/2019 | Azizi | H04L 5/0053 |
| 2020/0163021 | A1* | 5/2020 | Kim | H04W 52/02 |
| 2020/0196241 | A1* | 6/2020 | Lou | H04W 52/028 |
| 2020/0288397 | A1* | 9/2020 | Ahn | H04W 74/0808 |
| 2020/0344695 | A1* | 10/2020 | Wang | H04W 52/0274 |
| 2021/0068054 | A1* | 3/2021 | Ahn | H04W 52/02 |
| 2021/0099951 | A1* | 4/2021 | Kim | H04W 52/0206 |
| 2021/0185597 | A1* | 6/2021 | Chitrakar | H04W 52/0216 |
| 2021/0185612 | A1* | 6/2021 | Song | H04W 48/16 |
| 2021/0227469 | A1* | 7/2021 | Kim | H04W 52/0212 |

OTHER PUBLICATIONS

Aboul-Magd, "802.11 HEW SG Proposed Par," IEEE 802.11-14/0165r1 (Mar. 17, 2014).
Aboul-Magd, "IEEE 802.11 HEW SG Proposed CSD," IEEE 802.11-14/0169r0 (Jan. 22, 2014).
Aboul-Magd, "IEEE 802.11 HEW SG Proposed CSD," IEEE P802.11 Wireless LANs, IEEE 802.11-14/0169r1 (Mar. 18, 2014).
Azizi et al., "A PAR Proposal for Wake-up Radio," IEEE 802.11-16/1045r06 (Jul. 2016).
Azizi et al., "Wake-Up Receiver Usage Scenarios and Applications," IEEE 802.11-16/xxxxr0 (802.11-16/0974r0) (Jul. 25, 2016).
Chitrakar et al., "Enabling WUR Protection," IEEE 802.11-18/1168r1 (Jul. 2018).
Chitrakar et al., "Spec Text Update for WUR Discovery," 802.11ba Draft Specification, IEEE 802.11-18/1082r4 (Jul. 2018).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Wake Up Radio Operation, IEEE P802.11ba/D2.0 (Jan. 2019).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D2.2 (Feb. 2018).
Huang et al., "WUR Negotiation and Acknowledgement Procedure Follow up," IEEE 802.11-17/0342r3 (Mar. 12, 2017).
Huang, "Specification Framework for TGba," IEEE 802.11-17/0575r9 (Jan. 29, 2018).
Hwang et al., "Considerations on WUP bandwidth and CCA," IEEE 802.11-17/1013r1 (Jul. 11, 2017).
Hwang et al., "WUP CCA Problem," IEEE 802.11-17/1426r1 (Sep. 13, 2017).
IEEE P802.11 ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces(TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Marks et al., "Further Consideration on Smart Scanning Usage Model," IEEE 802.11-17/1644r1 (Nov. 8, 2017).
Nan et al., "Advertising WUR Discovery Frame Related Info for Fast Scanning," IEEE 802.11-18/0244r1 (Feb. 11, 2018).
Nan et al., "Consideration on WUR frame for Fast Scanning," IEEE 802.11-17/1619r2 (Jan. 2018).
Nan et al., "WUR Beacon transmission," IEEE 802.11-18/XXXr0 (IEEE 802.11-18/113r0) (Jan. 5, 2018).
Wang et al., "Indicating Neighboring BSS Discovery Frame Offset," IEEE 802.11-18/1554r0 (Sep. 11, 2018).
Wang et al., "Proposed Spec Text for Indicating Neighboring BSS's WUR Discovery Frame offset," 802.11ba Draft Specification, IEEE 802.11-18/1555r0 (Sep. 11, 2018).
Wang et al., "WUR-Only Discovery Mode for WUR STAs," IEEE 802.11-18/1552r0 (Sep. 11, 2018).

* cited by examiner

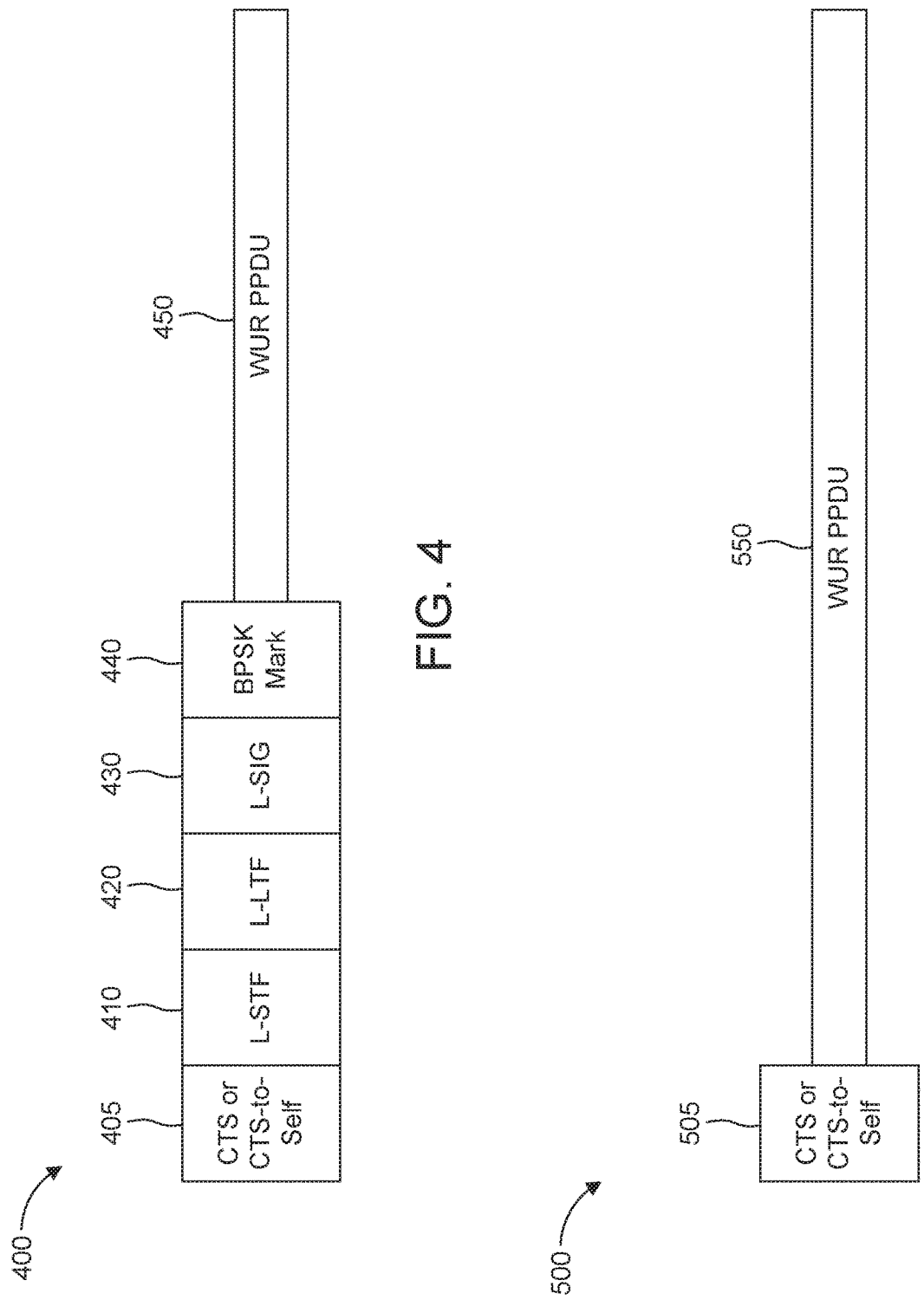

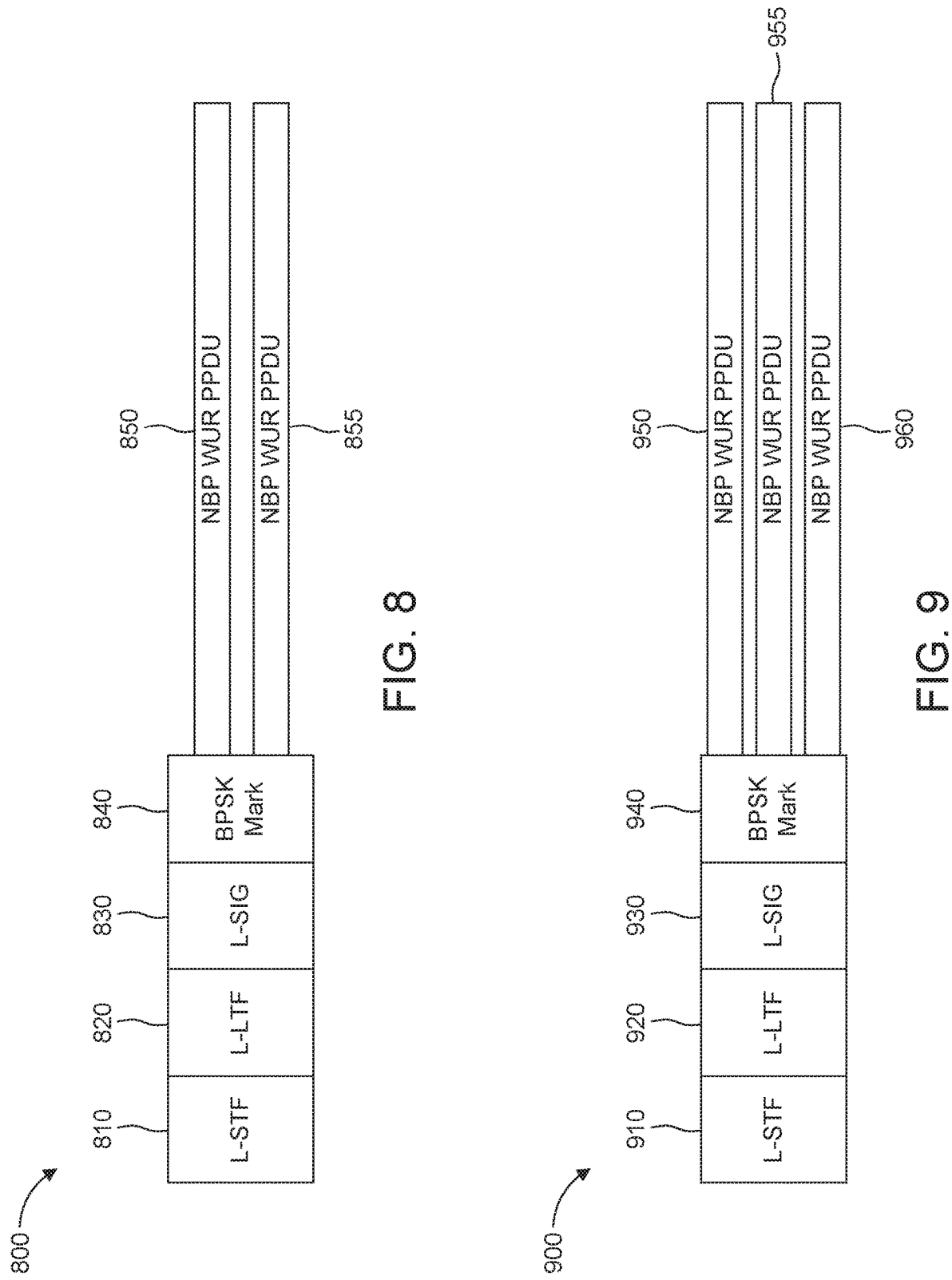

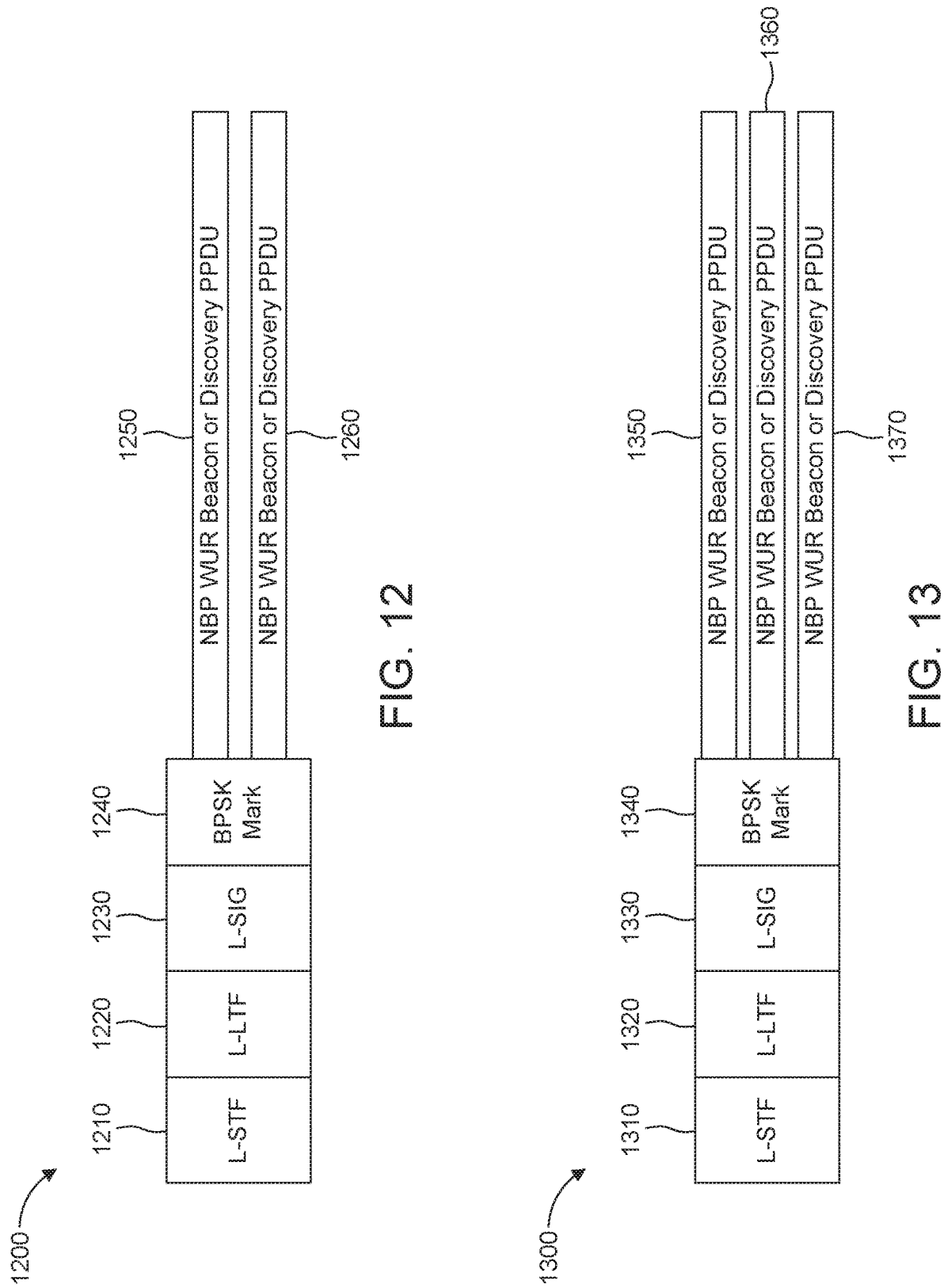

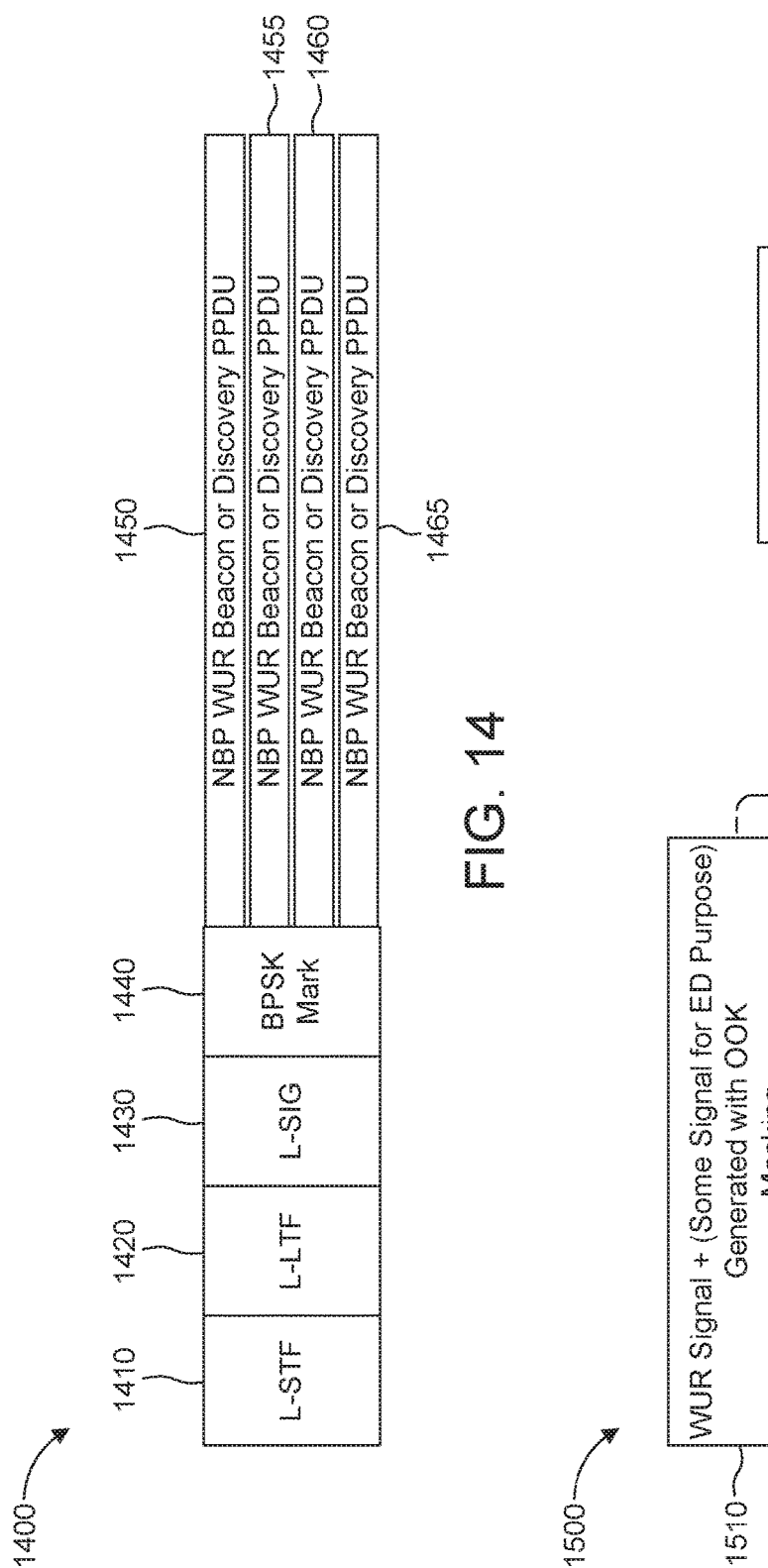
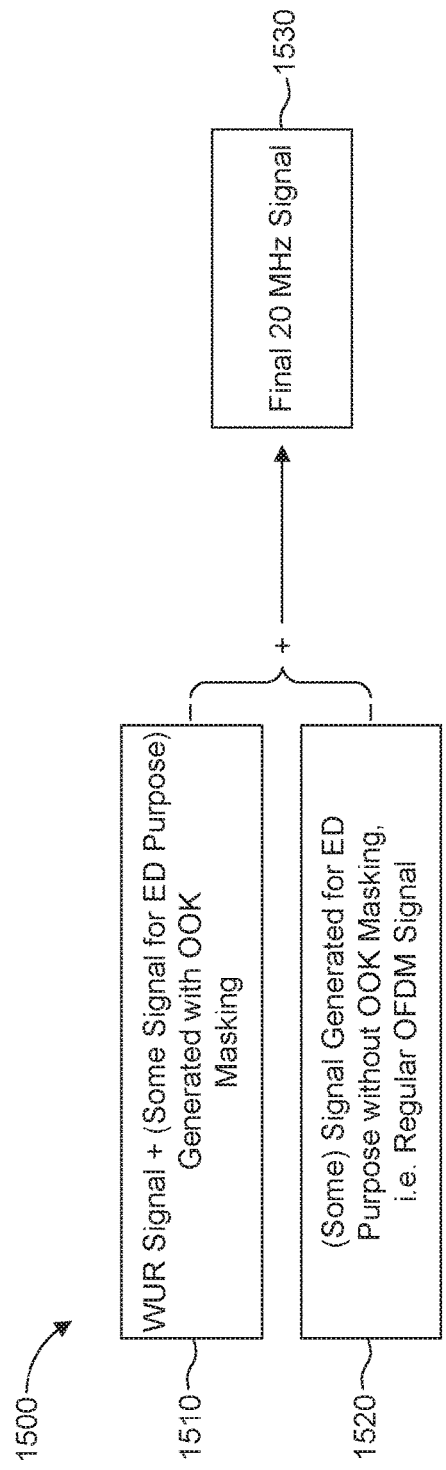
FIG. 14
FIG. 15

METHODS AND APPARATUSES FOR CHANNEL ACCESS AND RECOVERY WAKE-UP RADIOS

CROSS REFERENCE TO RELATED APPLICATION

This application is the U.S. National Stage, under 35 U.S.C. § 371, of International Application No. PCT/US2019/020548 filed Mar. 4, 2019, which claims the benefit of U.S. Provisional Application No. 62/637,747 filed Mar. 2, 2018, and U.S. Provisional Application No. 62/722,515 filed Aug. 24, 2018, the contents of which are incorporated herein by reference.

BACKGROUND

Many Internet of Things (IoT) devices are equipped with a small battery and are expected to have a very long operational life. For such devices, the reduction of energy consumption is often crucial for the expected long operation duration. Network discovery of a suitable access point (AP), especially in roaming scenarios, may consume a lot of energy if the IoT devices must turn on their Primary Connectivity Radio (PCR) (i.e., regular 802.11 radio) in order to discover such APs. Currently, a station (STA) is only allowed to enter wake-up radio (WUR) mode to receive a wake-up signal and turns off its PCR after the STA is associated with an AP. However, the STA is not allowed to use the WUR mode to discover a suitable network or roam around within a network. Thus, methods and apparatuses that allow a STA to perform network (e.g., AP) discovery as well as to conduct network association with minimum energy consumption using WUR are needed.

SUMMARY

Methods and apparatuses are described herein for power efficient network discovery and association. For example, a wireless transmit/receive unit (WTRU) may transmit, to a first access point (AP), via a first transceiver, a request frame indicating that on a condition that the WTRU is disassociated from the first AP, the WTRU will enter a wake-up radio (WUR) only discovery mode to monitor for at least one WUR frame based on one or more WUR discovery elements to be received in a beacon or response fame. The WTRU may receive, from the first AP, via the first transceiver, a management frame that has one or more WUR discovery elements including an indication of at least one channel to be used by a second AP. The management frame may be a beacon frame or a probe response frame. The one or more WUR discovery elements in the management frame may include at least one of an operating class, a WUR discovery channel, a WUR channel, or WUR parameters of the second AP. The WTUR may perform disassociation from the first AP. The WTRU may activate a second transceiver and deactivate the first transceiver. The WTRU may enter the WUR only discovery mode after the second transceiver is activated and the first transceiver is deactivated. On a condition that the WTRU is disassociated from the first AP, the WTRU may receive, from the second AP, via the second transceiver, a WUR frame over the indicated at least one channel to enable the WTRU to activate the PCR transceiver to initiate association or authentication with the second AP. The WUR frame may be a WUR discovery frame, a WUR beacon frame, a WUR wake-up frame, or a WUR vendor specific frame. Specifically, on a condition that the WUR frame is a WUR discovery frame, the WTRU may monitor the WUR discovery frame over the WUR discovery channel. On a condition that the WUR frame is one of a WUR beacon frame, a WUR wake-up frame, or a WUR vendor specific frame, the WTRU may monitor the respective WUR beacon, WUR wake-up, or WUR vendor specific frame over the WUR channel. Once the WTRU receives the WUR frame over the indicated at least one channel, the WTRU may activate the first transceiver to initiate further discovery, or authentication and association with the second AP. The WTRU may then transmit, to the second AP, via the first transceiver, an authentication request or association request frame. The first transceiver may be a Primary Connectivity Radio (PCR) and the second transceiver may be a companion radio, WUR radio or WUR receiver operatively coupled to the first transceiver.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 4 is a diagram illustrating an example signal configuration where a STA transmits a WUR PPDU with legacy preamble immediately following the CTS or CTS-to-Self without any interframe spacing (xIFS);

FIG. 5 is a diagram illustrating an example signal configuration where a STA transmits a CTS or CTS-to-Self and then transmits a WUR PPDU without legacy preamble;

FIG. 8 is a diagram illustrating first example signal configuration of multiple copies of Narrow Band Protection (NBP) of the same WUR PPDU over the 20 MHz channel;

FIG. 9 is a diagram illustrating second example signal configuration of multiple copies of NBP of the same WUR PPDU over the 20 MHz channel;

FIG. 12 is a diagram illustrating first example signal configuration of multiple copies of the NBP of the WUR Beacon or Discovery frame over the 20 MHz channel;

FIG. 13 is a diagram illustrating second example signal configuration of multiple copies of the NBP of the WUR Beacon or Discovery frame over the 20 MHz channel;

FIG. 14 is a diagram illustrating third example signal configuration of multiple copies of the NBP of the WUR Beacon or Discovery frame over the 20 MHz channel;

FIG. 15 is a diagram illustrating an example combination of unmasked and masked signals;

DETAILED DESCRIPTION

Figure 1A:
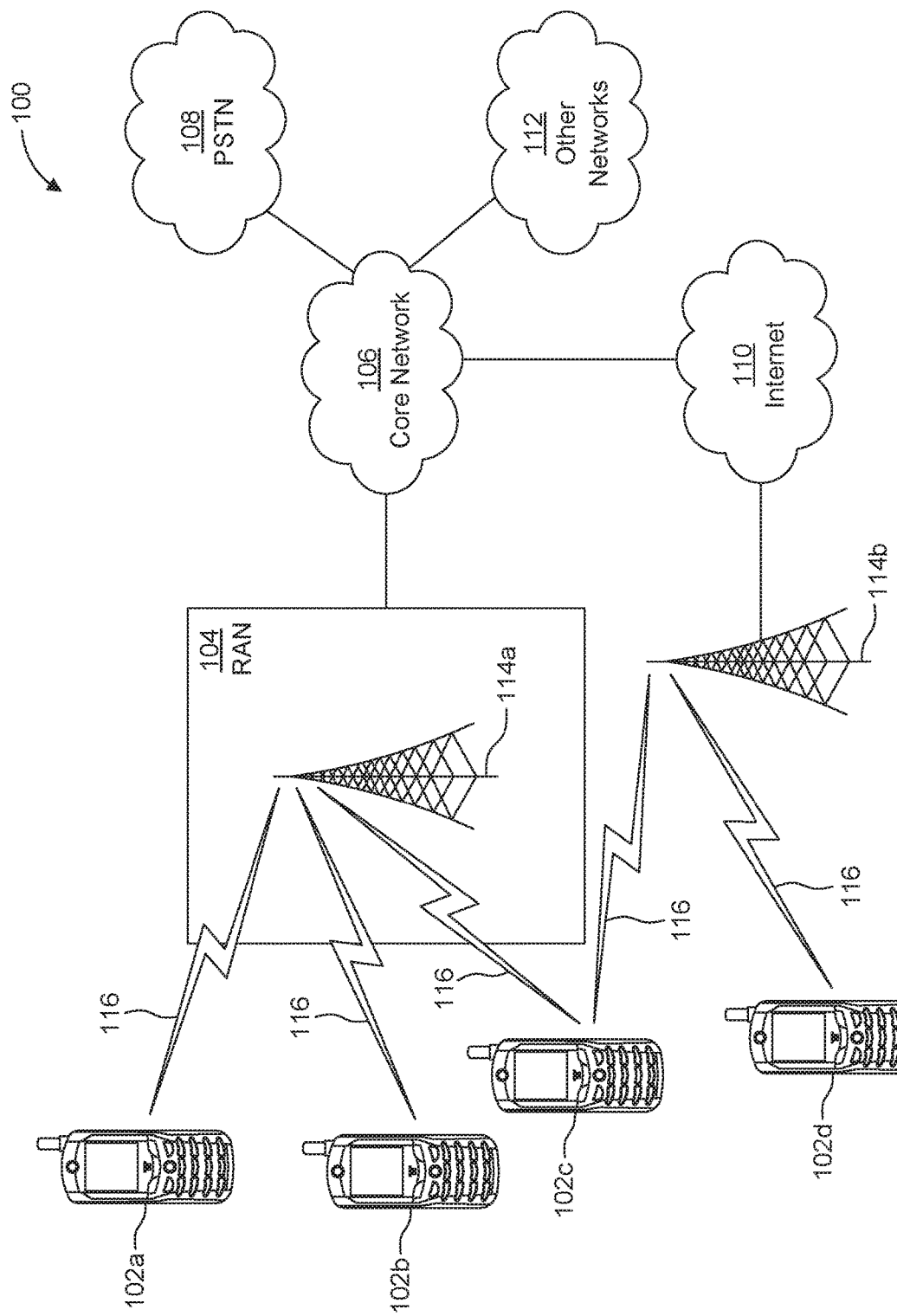
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a device, a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE, STA, or a device. In some instances, an AP or base station may also be referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
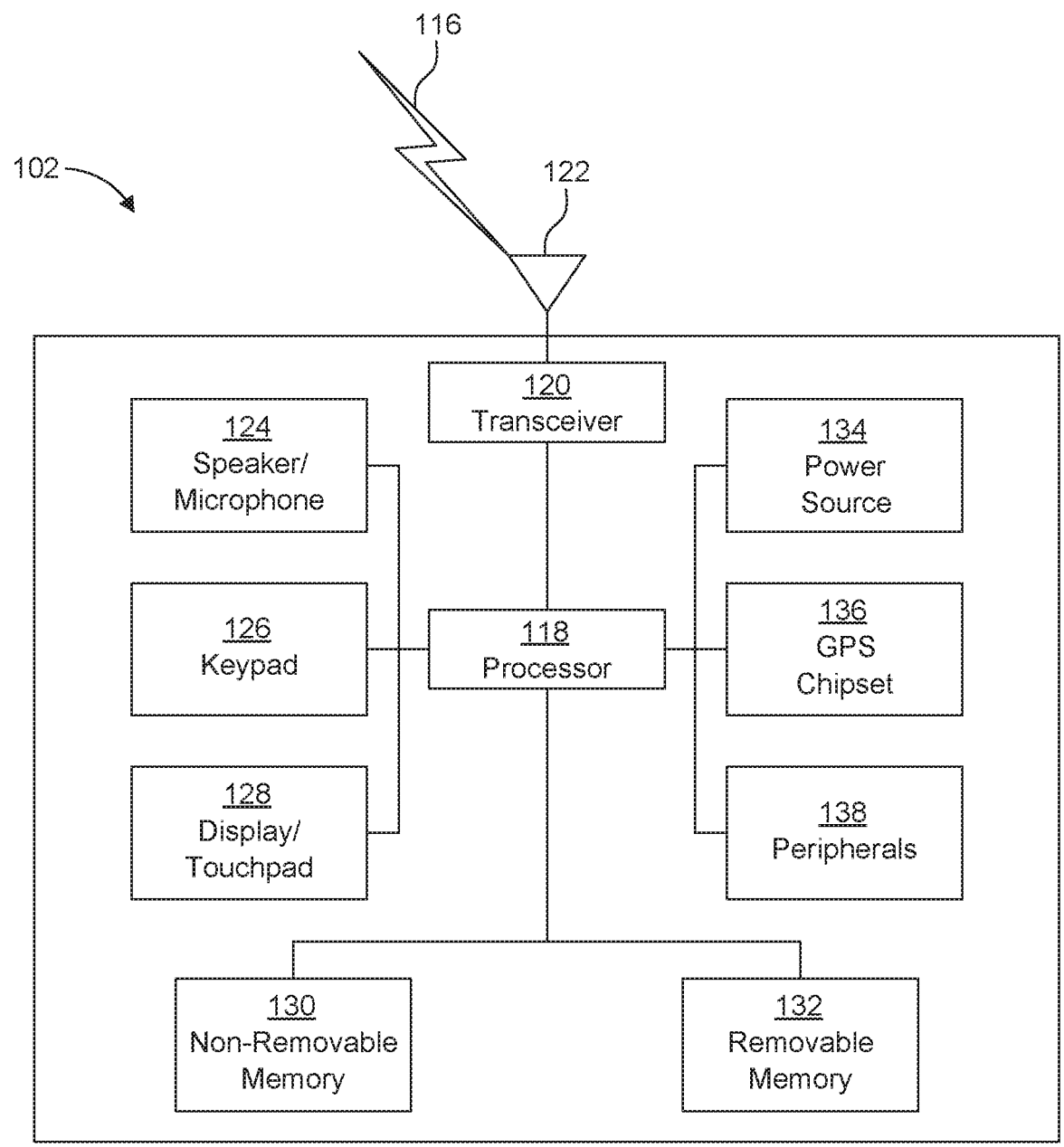
FIG. 1B is a system diagram illustrating an example wireless transmit/receive unit (WTRU) that may be used within the communications system illustrated in FIG. 1A according to one or more embodiments.
Figure 1C:
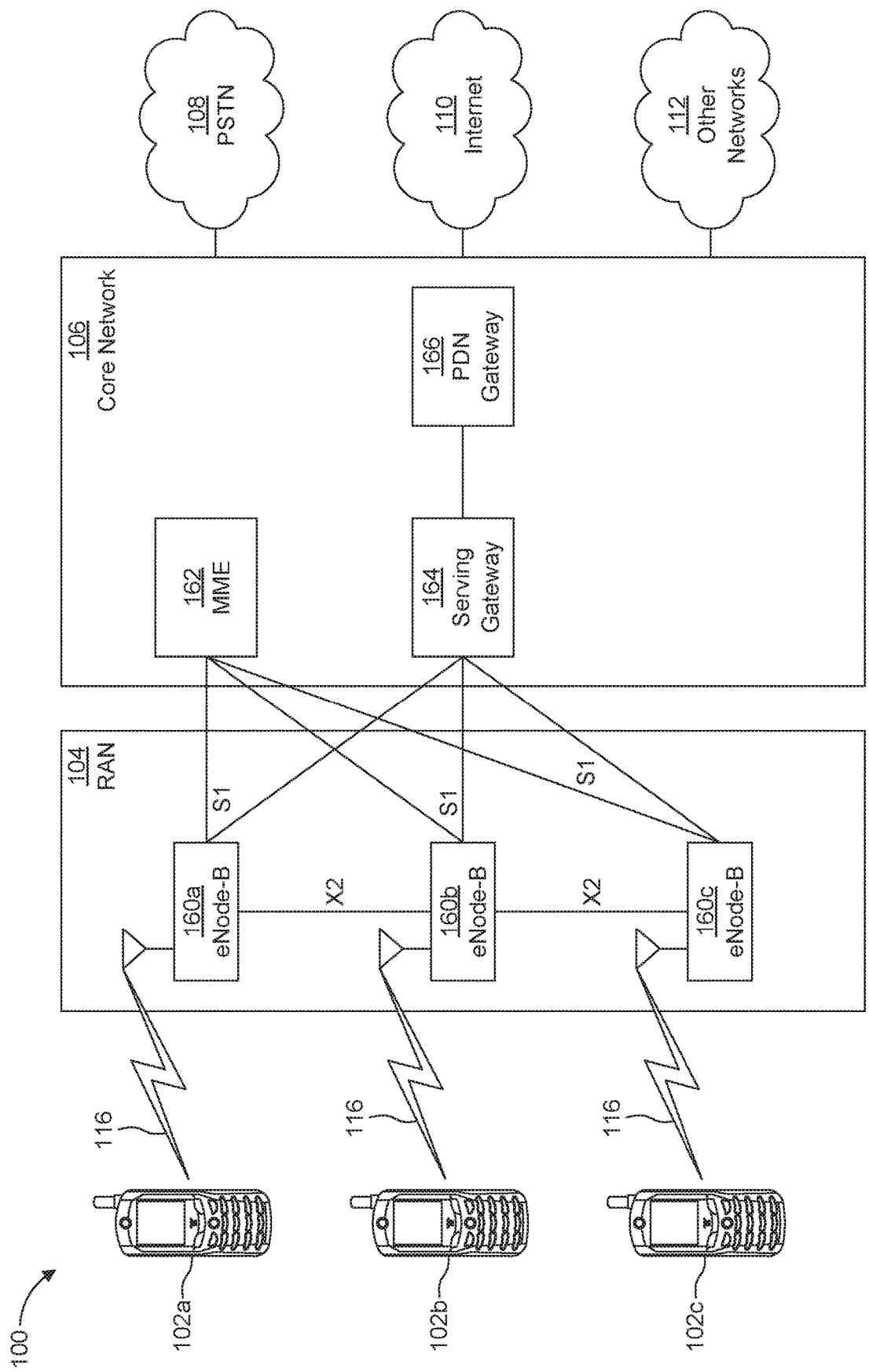
FIG. 1C is a system diagram illustrating an example radio access network (RAN) and an example core network (CN) that may be used within the communications system illustrated in FIG. 1A according to one or more embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) or an access point (AP) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

Although it is not shown in FIG. 1B, the transceiver 120 may comprise a main transceiver (or primary connectivity radio) and a secondary transceiver (or wake-up radio) that are operatively coupled to the processor 118 and the transmit/receive element 122.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 10:
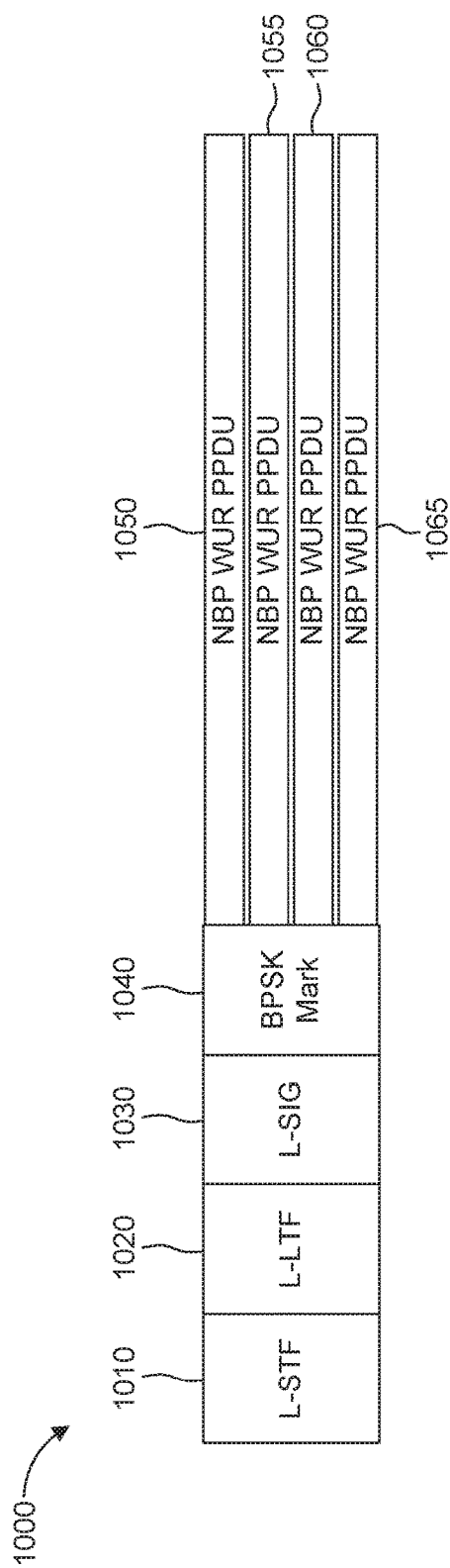
FIG. 10 is a diagram illustrating third example signal configuration of multiple copies of NBP of the same WUR PPDU over the 20 MHz channel.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
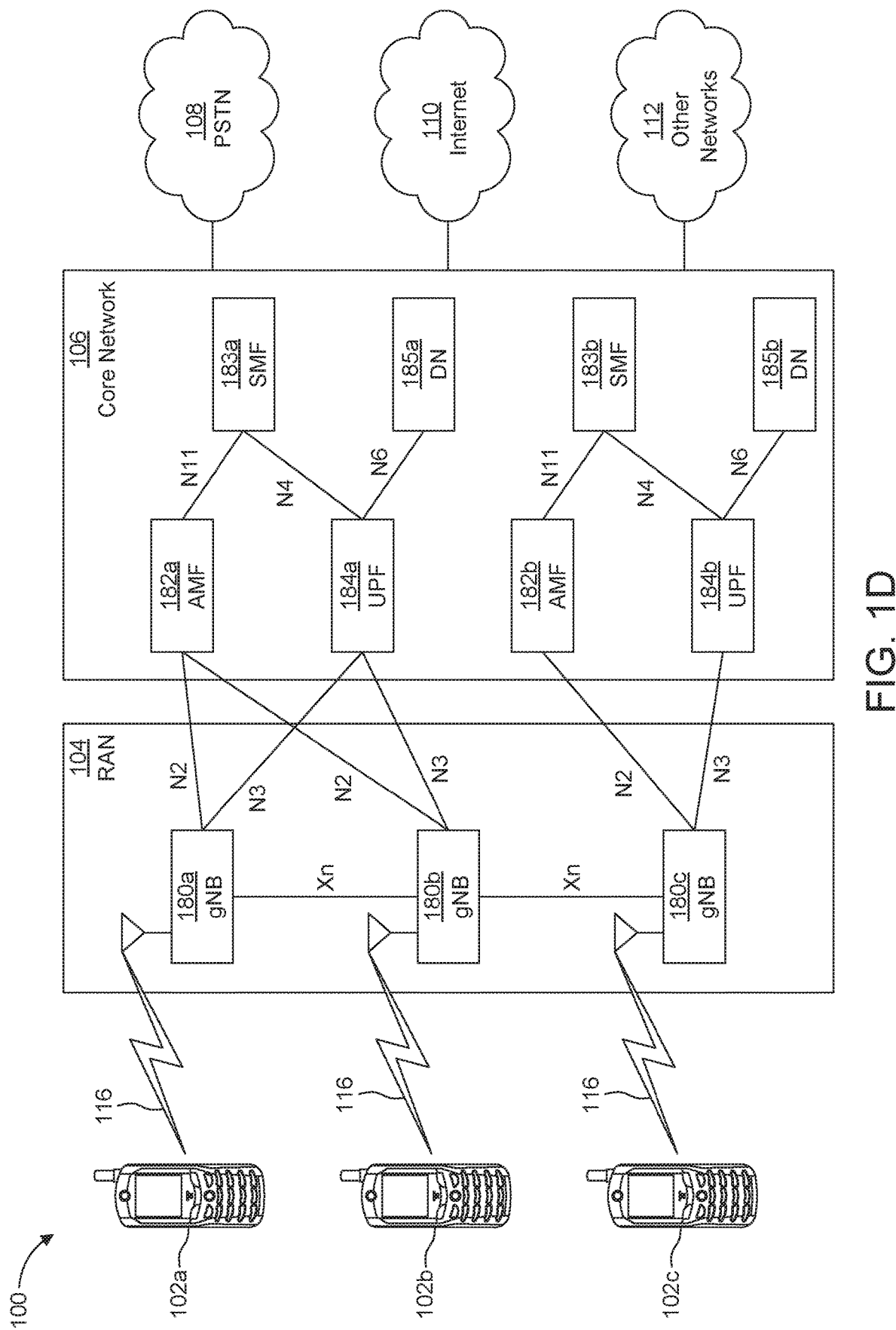
FIG. 1D is a system diagram illustrating a further example RAN and a further example CN that may be used within the communications system illustrated in FIG. 1A according to one or more embodiments.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WLAN in Infrastructure Basic Service Set (BSS) mode may have an access point (AP) for the BSS and one or more stations (STAs) associated with the AP. The AP may have access or interface to a distribution system (DS) or another type of wired/wireless network that carries traffic in and out of the BSS. Traffic to STAs that originates from outside the BSS may arrive through the AP and may be delivered to the STAs. Traffic originating from STAs to destinations outside the BSS may be sent to the AP to be delivered to the respective destinations. Traffic between STAs within the BSS may also be sent through the AP where the source STA sends traffic to the AP and the AP delivers the traffic to the destination STA. Such traffic between STAs within a BSS may be considered peer-to-peer traffic. Such peer-to-peer traffic may also be sent directly between the source and destination STAs with a direct link setup (DLS) using an 802.11e DLS or an 802.11z tunneled DLS (TDLS). A WLAN using an independent BSS (IBSS) mode may have no AP, and/or STAs, communicating directly with each other. This mode of communication is referred to as an "ad-hoc" mode of communication.

Using the 802.11ac infrastructure mode of operation, an AP may transmit a beacon on a fixed channel, usually the primary channel. This channel may be 20 MHz wide, and may be the operating channel of the BSS. This channel may be also used by the STAs to establish a connection with the AP. In one example, the fundamental channel access mechanism in an 802.11 system may be carrier sense multiple access with collision avoidance (CSMA/CA). In this mode of operation, every STA, including the AP, will sense the primary channel. If the channel is detected to be busy, the STA backs off. Hence only one STA may transmit at any given time in a given BSS.

In 802.11n, high throughput (HT) STAs may also use a 40 MHz wide channel for communication. This may be achieved by combining the primary 20 MHz channel, with an adjacent 20 MHz channel to form a 40 MHz wide contiguous channel.

In 802.11ac, very high throughput (VHT) STAs may support 20 MHz, 40 MHz, 80 MHz, and 160 MHz wide channels. The 40 MHz, and 80 MHz, channels may be formed by combining contiguous 20 MHz channels similar to 802.11n described herein. A 160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, may be passed through a segment parser that divides it into two streams. Inverse fast Fourier transform (IFFT), and time domain, processing may be done on each stream separately. The streams may then be mapped on to the two channels, and the data may be transmitted. At the receiver, this mechanism may be reversed, and the combined data may be sent to the MAC.

Sub 1 GHz modes of operation may be supported by 802.11af, and 802.11ah. For these protocols the channel operating bandwidths, and carriers, may be reduced relative to those used in 802.11n, and 802.11ac. 802.11af may support 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. A possible use case for 802.11ah may be support for MTC devices in a macro coverage area. MTC devices may have limited capabilities including only support for limited bandwidths, but may also include a requirement for a very long battery life.

In one example, WLAN systems which support multiple channels, and channel widths, such as 802.11n, 802.11ac, 802.11af, and 802.11ah, may include a channel which is designated as the primary channel. The primary channel may, but not necessarily, have a bandwidth equal to the largest common operating bandwidth supported by all STAs in the BSS. The bandwidth of the primary channel may therefore be limited by the STA, of all STAs in operating in a BSS, which supports the smallest bandwidth operating mode. In the scenario of 802.11ah, the primary channel may be 1 MHz wide if there are STAs (e.g. MTC type devices) that only support a 1 MHz mode even if the AP, and other STAs in the BSS, may support a 2 MHz, 4 MHz, 8 MHz, 16 MHz, or other channel bandwidth operating modes. All carrier sensing, and network allocation vector (NAV) settings, may depend on the status of the primary channel. For instance, if the primary channel is busy due to a STA, that only supports a 1 MHz operating mode, transmitting to the AP, then the entire available frequency bands are considered busy even though the majority of the frequency bands stay idle and available.

In the United States, the available frequency bands that may be used by 802.11ah are from 902 MHz to 928 MHz. In Korea it is from 917.5 MHz to 923.5 MHz; and in Japan, it is from 916.5 MHz to 927.5 MHz. The total bandwidth available for 802.11ah is 6 MHz to 26 MHz depending on the country code.

In 802.11 high efficiency WLAN (HEW), potential application may include emerging usage scenarios such as high density situations using the 2.4 GHz and 5 GHz band. New use cases that support dense deployments of APs, and STAs, and associated Radio Resource Management (RRM) technologies may also be considered. For example, use cases may include data delivery for stadium events, transit stations, enterprise/retail environments, video delivery, and wireless services for medical applications.

The 802.11ax may address the use of short packets in a variety of applications. The applications include, for example: virtual office; transmit power control (TPC) ACK; video streaming ACK; device/controller (mice, keyboards, game controls, etc.); access such as probe request/response; network selection such as probe requests, access network protocol query (ANQP); network management such as control frames; and/or the like.

Also, 802.11ax may address multi-user (MU) features that include uplink (UL) and downlink (DL) orthogonal frequency division multiple access (OFDMA) and UL and DL MU-multiple in multiple out (MIMO). Methods and systems for multiplexing UL random access for different purposes may be addressed herein.

There may be a need for a PHY and MAC amendment to provide enhanced low power operations of 802.11 devices. The MAC and PHY amendments may enable operations of a wake-up radio (WUR).

Figure 1E:
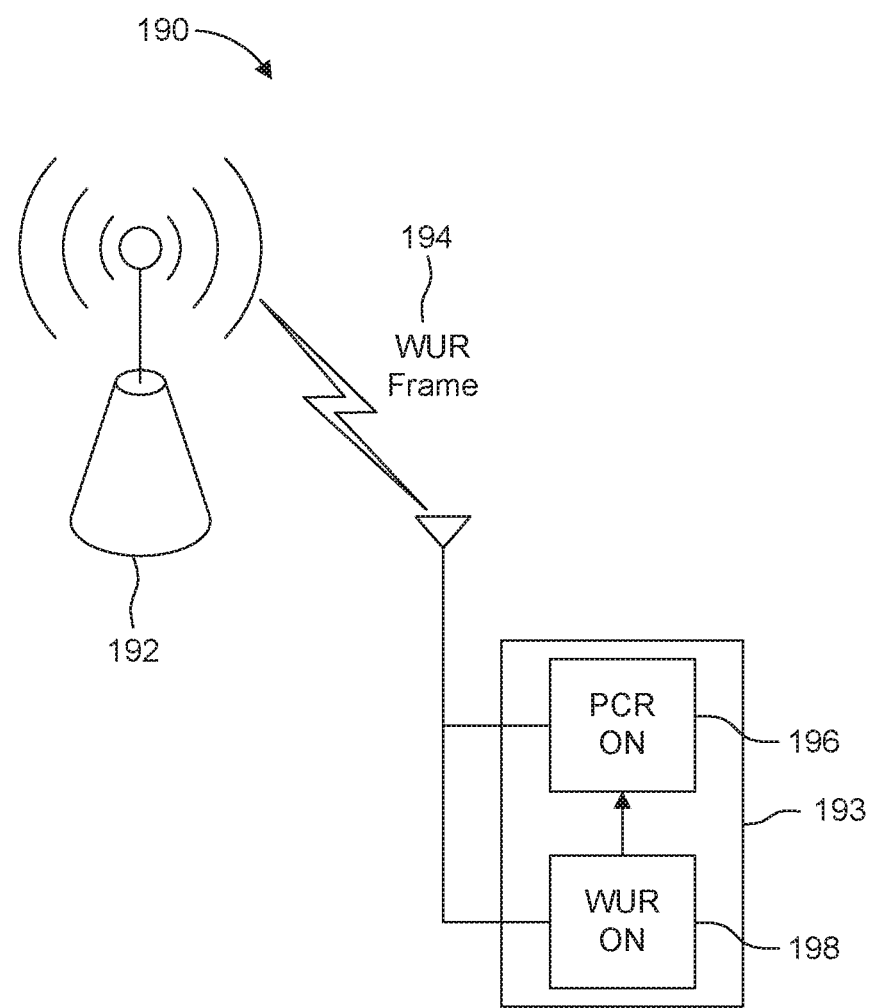
FIG. 1E is a diagram illustrating an example wake-up radio (WUR) system in which one or more disclosed embodiments may be implemented.

FIG. 1E illustrates an example wake-up radio (WUR) system 190 in which one or more disclosed embodiments may be implemented. As illustrated in FIG. 1E, a WTRU 192 (e.g., IoT device) may include a primary connectivity radio (PCR) transceiver 196 and a WUR transceiver 198. The WUR transceiver 198 may operate as a companion radio to the PCR transceiver 196 to receive a wake-up signal or a wake-up radio (WUR) frame 194. The wake-up signal or WUR frame 194 may carry control information and may have active receiver power consumption of less than one milliwatt (mW). Receiving the wake-up signal or WUR frame 194 by the WUR transceiver 198 may cause the PCR transceiver 196 to wake up from sleep. For example, a WUR frame 194 transmitted from an access point (AP) 192 may trigger a WTRU 193 equipped with the WUR transceiver 198 to wake up from the sleep mode and initiate reception activities or association/authentication procedures using the PCR transceiver 196. The PCR transceiver 196 may be designed to transmit and receive large amount of data, for example, at Mb/s or even Gb/s. The PCR transceiver 196 may be used to transmit regular 802.11 packets or cellular packets. The WUR transceiver 198 may be designed to transmit and receive small amount of data with very low power consumption (e.g., less than 1 mW). The WUR transceiver 198 may operate in 2.4 GHz, 5 GHz and may be extended to Sub 1 GHz. The WUR may have a range that is at least the same as the range of the primary connectivity radio operating on at least 20 MHz payload bandwidth.

An AP, non-AP STAs, WTRU, or other such device may have WUR as a companion radio. Some usage cases for WUR may include, but are not limited to: IoT devices; low power operation for mobile stations; quick message/incoming call notification scenario; quick status query/report, configuration change scenario; and/or quick emergency/critical event report scenario. The terms access point (AP) and base station (BS) may be used interchangeably throughout this disclosure.

As used herein, the term primary connectivity radio (PCR) may refer to a main radio with capability to transmit and receive one or more physical layer protocol data units (PPDU) over various channels. The term wake-up radio (WUR) may refer to a companion radio to a PCR with the capability to transmit and/or receive one or more WUR PPDUs. As used herein, the terms wake-up radio, wake-up radio receiver, wake-up radio transceiver, wake-up radio device, WUR mode, low power mode, low power receive mode, companion transceiver, companion receiver, companion radio, passive receiver, passive transceiver, zero-energy (ZE) receiver, ZE transceiver, secondary transceiver or any combination thereof may be used interchangeably throughout this disclosure. The terms primary connectivity radio, primary connectivity transceiver, main receiver, main transceiver, main modem, primary transceiver or any combination thereof may be used interchangeably throughout this disclosure. As used herein, the term WUR receiver (WURx) may refer to a station (STA) that can transmit and/or receive a WUR PPDU or the lower power mode where the STA can transmit and/or receive a WUR PPDU. Accordingly, the terms WURx, WUR mode, low power mode, low power operation mode, low power receive mode or any combination thereof may be used interchangeably throughout this disclosure. As used herein, the terms wake-up radio (WUR) packet, WUR signal, WUR frame, or any combination thereof may be used interchangeably throughout this disclosure.

The term WUR AP may refer to an AP that can transmit and/or receive a WUR PPDU and supports the WUR mechanism. The term WUR non-AP STA or WUR STA may refer to a non-AP STA that can transmit and/or receiving a WUR PPDU and supports the WUR mechanism. The term WUR channel may refer to a channel in which a WUR AP transmits WUR frames and a WUR non-AP STA listens. The term WUR discovery channel may refer to a channel in which the WUR discovery frames are transmitted. The term WUR mode may refer to a negotiation status between a WUR AP and a WUR non-AP STA such that the WUR non-AP STA alternates between the WUR awake state and the WUR doze state when the WUR non-AP STA is in the doze state. The term WUR only discovery mode may refer to a mode in which a WUR non-AP STA only has its WUR turned on but is unassociated with any WUR AP. The terms WUR only discovery mode, WUR only discovery state, WUR only mode, WUR only state, roaming mode, or any combination thereof may be used interchangeably throughout this disclosure.

802.11ba may concern narrow band wake up packets and related clear channel assessment (CCA) issues. For example: a full-band wake up packet may be used to prevent CCA detection issues. Also, frequency multiplexing of multiple wake up packets may be used, and/or specific extended tone sequences may be used in addition to the narrow band wake up packets.

802.11ba may also concern beacon transmissions, such as having an AP transmitting on all WUR channels based on the timing accuracy required in each wake up channel to transmit the WUR beacons; alternatively, the AP may transmit just on one WUR channels in a given 20 MHz band.

802.11ba may also concern fault recovery for AP, such as starting a timeout interval after transmitting a WUP; if the timeout interval expires and no packet has been received from the targeted STA, the WUP transmission may be considered as failed and the AP should transmit a new WUP; If multiple WUPs are transmitted within the same timeout interval, then a new Timeout interval may be started.

Figure 2:
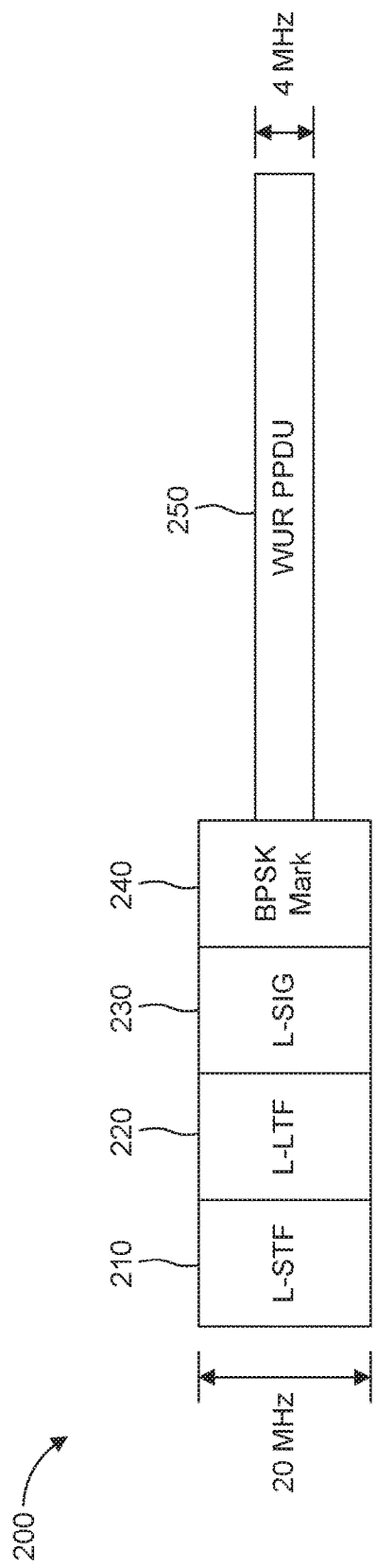
FIG. 2 is a diagram illustrating an example signal configuration of wake-up radio physical layer protocol data unit (WUR PPDU) with a legacy preamble and binary phase shift keying (BPSK) mark.

FIG. 2 illustrates an example signal configuration 200 of wake-up radio physical layer protocol data unit (WUR PPDU) with a legacy preamble and binary phase shift keying (BPSK) mark (for all signal transmissions discussed herein, the horizontal axis may represent time and the vertical axis may represent bandwidth), which may be used in combination with any of other embodiments described herein. For 802.11ba, a WUR PPDU 250 may be prepended with a 20 MHz non-HT preamble, including legacy short training field (L-STF) 210, legacy long training field (L-LTF) 220, legacy signal field (L-SIG) 230 and a BPSK mark field 240 of 4 μs duration. The narrow band portion (NBP) of the WUR PPDU 250 itself may be 4 MHz wide. While the NBP of the WUR PPDU 250 may only occupy 4 MHz bandwidth, CCA by other WLAN devices, as well as other devices that share the band, such as New Radio-Unlicensed (NR-U), may conduct CCA or listen before talk (LBT) on the 20 MHz band. The narrow band signals may lead to lower energy and may not trigger energy detections (ED) or (signal detection) by other WLAN or other types of devices. Wake-up packets and associated transmission and receive procedures may need to be designed so that devices conducting CCA or LBT may correctly detect that the medium is busy and occupied when a WUR PPDU 250 is being transmitted over the wireless medium.

Figure 3:
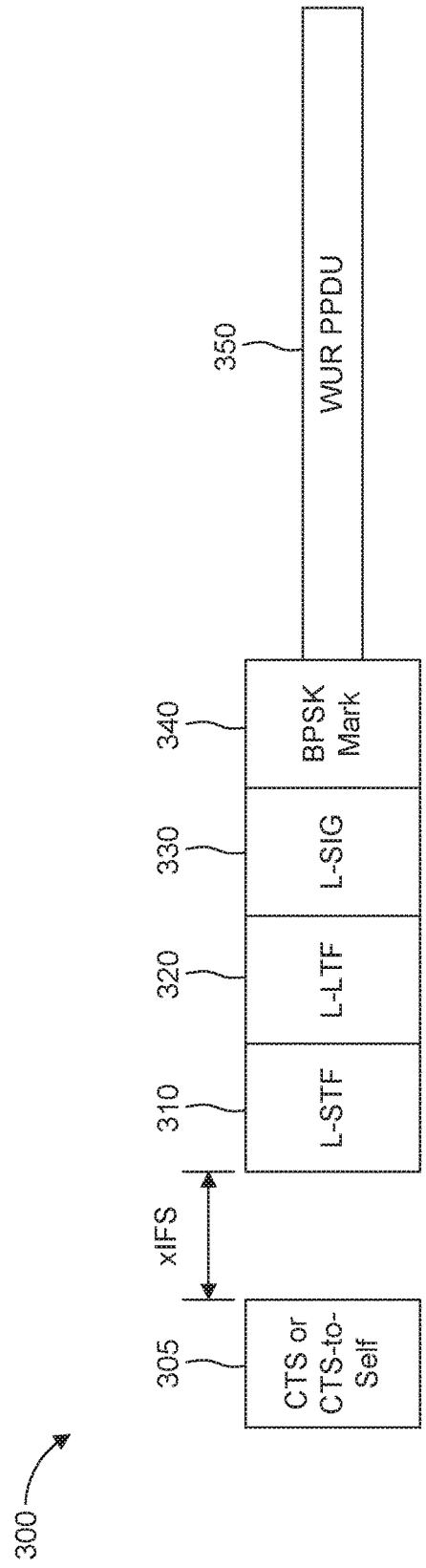
FIG. 3 is a diagram illustrating an example signal configuration where a STA transmits a clear to send (CTS) or CTS-to-Self before transmitting a WUR PPDU.

FIG. 3 illustrates an example signal configuration 300 where a STA transmits a clear to send (CTS) or CTS-to-Self before transmitting a WUR PPDU, which may be used in combination with any of other embodiments described herein. A STA may transmit a CTS or CTS-to-Self 305 before it transmits a WUR PPDU 350. In one embodiment, a STA may transmit a CTS or a CTS-to-Self 305, then transmit the WUR PPDU 350 together with the legacy preambles (i.e. L-STF 310, L-LTF 320, L-SIG 330) and interframe spacing (xIFS) time 307 after the completion of the CTS or CTS-to-Self 305. The xIFS time 307 may be a shortest interframe spacing (SIFS), arbitrary interframe spacing (AIFS), or other type of inter frame separations. In the CTS or CTS-to-Self 305, there may be indications that the CTS or CTS-to-Self 305 is transmitted proceeding or protecting one or more WUR PPDUs 350. The CTS or CTS-to-Self 305 may contain information in the receiver address (RA) address field or other fields, of either the address of the STA transmitting the CTS or CTS-to-Self 305, or the address that is associated with WUR indication or associated with the address, or the group addresses, of STA(s) that are the recipients of the WUR PPDU 350 following the CTS or CTS-to-self 305. Such information may also be embedded or contained in other fields of the CTS or CTS-to-Self 305, such as preamble, MAC header, FCS, scrambling sequences, and the like.

The STA may transmit one or more WUR PPDUs with the legacy preambles following the CTS or CTS-to-Self. There may be interframe spacing (xIFS), such as short interframe spacing (SIFS), separations between each WUR PPDUs. The CTS or CTS-to-Self may reserve the medium until the end of one or a number of WUR PPDUs that are following the CTS or CTS-to-Self. Each legacy preamble may provide additional NAV (e.g., in the L-SIG portion) to protect the next WUR PPDU, or the next sequence of WUR PPDUs. All STAs that have received the CTS or CTS-to-Self, and are not recipients of the CTS or CTS-to-Self may obey the NAV, and may go to sleep until the end of the NAV. If a STA that has their PCR transceiver on and identifies one or more indications contained in the CTS or CTS-to-self, and the STA detects, for example, an RA address that is associated with itself or a group address that is associated with a set of STA of which the STA is a member, the STA may turn on its WUR transceiver, and receive the transmitted WUR PPDU following the CTS or CTS-to-Self, and identify whether the WUR PPDU is meant for itself, and/or transmit a packet, such as power save-poll (PS-Poll), or any other types of packets to the AP to announce that it is actually awake and has its PCR transceiver turned on, to address a status mismatch problem. Alternatively or additionally, the STA may directly transmit a frame using its PCR transceiver to the AP to indicate that it is awake without using its WUR transceiver to receive the WUR PPDU. Such a transmission of packets to the AP may use standard enhanced distributed channel access (EDCA), or any other medium access procedures that may be currently in use, including a trigger frame with or without resources allocated to random access.

FIG. 4 illustrates an example signal configuration 400 where a STA transmits a WUR PPDU with legacy preamble immediately following the CTS or CTS-to-Self without any xIFS, which may be used in combination with any of other embodiments described herein. As illustrated in FIG. 4, a STA may transmit a CTS or a CTS-to-Self 405, the legacy preambles (i.e. L-STF 410, L-LTF 420, L-SIG 430), and the WUR PPDU 450 together without any interframe spacing (xIFS). Additional WUR PPDUs with or without legacy preambles may follow the initial WUR PPDU 450 with legacy preamble 410, 420, 430, either with or without xIFS.

FIG. 5 illustrates an example signal configuration 500 where a STA may transmit a CTS or CTS-to-Self and then transmit a WUR PPDU without legacy preamble which may be used in combination with any of other embodiments described herein. As illustrated in FIG. 5, a STA may transmit the WUR PPDU 550 without legacy preamble immediately following the CTS or CTS-to-Self 505 without any xIFS. Additional NBP WUR PPDUs with or without legacy preambles, and/or with and without CTS or CTS-to-Self 505, may follow the initial WUR PPDU 550, either with or without xIFS In another example, the STA may transmit the NBP WUR PPDU without a legacy preamble, but with one or more of the following fields of L-STF, L-LTF, L-SIG, BPSK-Mark, immediately following the CTS or CTS-to-Self without any xIFS. Additional WUR PPDUs with or without legacy preambles, and/or with and without CTS or CTS-to-Self, with or without one or more 20 MHz fields (such as L-STF, L-LTF, L-SIG, BPSK-Mark) may follow the initial WUR PPDU, either with or without xIFS.

Figure 6:
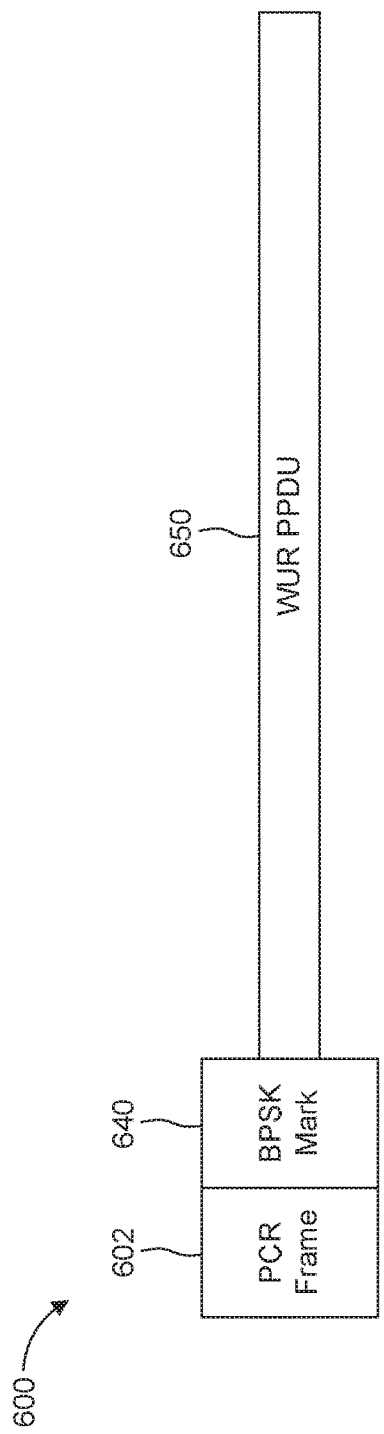
FIG. 6 is a diagram illustrating an example signal configuration aggregating primary connectivity radio (PCR) frame with wake-up radio (WUR) PPDU.

FIG. 6 illustrates an example signal configuration 600 aggregating PCR frame with WUR PPDU, which may be used in combination with any of other embodiments described herein. The PCR frame 602, which may include one or more fields of legacy header, PCR header, and MAC body, may be transmitted at the beginning. Then there may be one or more of the following fields of L-STF, L-LTF, L-SIG, BPSK-mark 640, immediately following the PCR frame 602 with or without any xIFS. Additionally, NBT WUR PPDU 650 may follow with or without any 20 MHz wide fields, with or without xIFS.

Additionally or alternatively, the PCR frame 602 may carry NAV settings for protection until the end of the NBP of the WUR PPDU 650. The PCR frame 602 and/or the BPSK mark 640 or any other fields may carry an indication that one or more WUR PPDU(s) 650 is appended to the PCR frame 602. In one instance, the BPSK mark 640 may be omitted.

Figure 7:
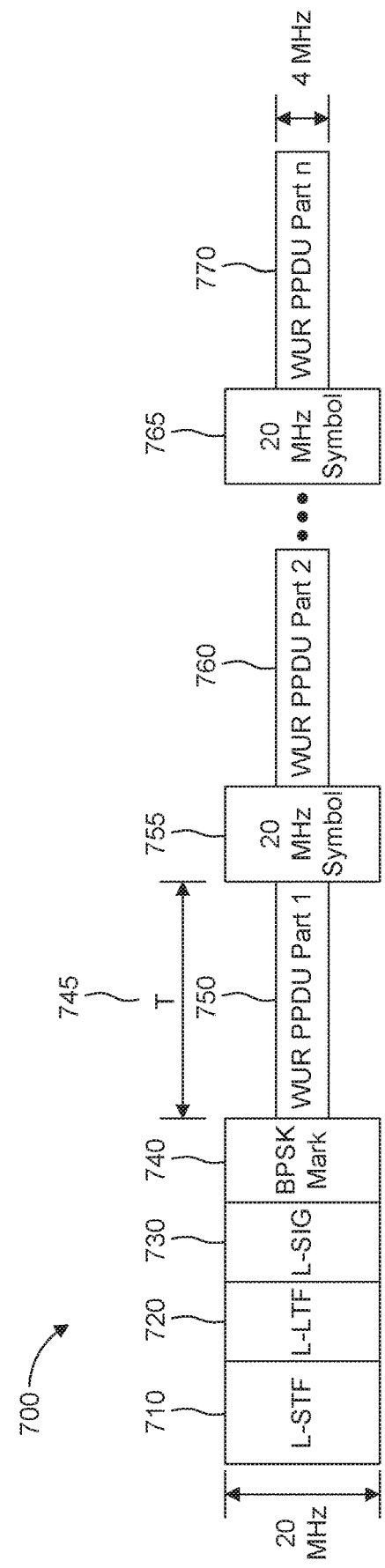
FIG. 7 is a diagram illustrating example signal configuration of multiple 20 MHz wide symbols throughout the Narrow Band WUR PPDU.

FIG. 7 illustrates an example signal configuration 700 of multiple 20 MHz wide symbols throughout the Narrow Band WUR PPDU, which may be used in combination with any of other embodiments described herein. As illustrated in FIG. 7, in order to provide sufficient energy over the entire 20 MHz band for CCA detections or LBT detections, multiple 20 MHz wide symbols 755, 765 may be inserted throughout the narrow band WUR PPDUs 750, 760, 770. These 20 MHz wide symbols 755, 765 may comprise one or more symbols, and may include one or more copies of the following fields such as L-STF 710, L-LTF 720, L-SIG 730, and/or BPSK mark 740. The 20 MHz wide symbols 755, 765 may be 4 μs duration. The consecutive 20 MHz wide symbols 755, 765 or groups of 20 MHz wide symbols 755, 765 may be separated by an interval T 745. Such a T 745 may be determined based on medium access parameters, such as distributed coordination function inter frame spacing (DIFS) for WLAN devices, and/or listen-before-talk (LBT) requirements for other types of devices, such as NR or NR-U, or license assisted access (LAA). Such 20 MHz wide symbols 755, 765 may enable other WLAN devices or other types of devices sharing the same band to conduct energy detection or signal detection and trigger the CCA or LBT to be positive for the entire duration of the narrow band WUR PPDUs 750, 760, 770, so that they will not access the medium and transmit over the narrow band WUR PPDUs 750, 760, 770 and cause interference.

FIGS. 8, 9, and 10 illustrates example signal configurations 800, 900, 1000 where a STA duplicates multiple copies of Narrow Band Protection (NBP) of the same WUR PPDU over the 20 MHz channel, which may be used in combination with any of other embodiments described herein. A STA transmitting a unicast or multicast WUP may duplicate the NBP WUP PPDU over the 20 MHz channel. For example, the transmitting STA may follow the non-HT preamble and BPSK mark with multiple copies of the NBP of the same WUPs multiplexed over the 20 MHz channel. In FIG. 8, a STA transmitting a WUP may transmit two copies of the NBP WUR PPDUs 850, 855 over the 20 MHz channels after transmitting L-STF 810, L-LTF 820, L-SIG 830, and BPSK mark 840. In FIG. 9, a STA transmitting a WUP may transmit three copies of the NBP WUR PPDUs 950, 955, 960 over the 20 MHz channels after transmitting L-STF 910, L-LTF 920, L-SIG 930, and BPSK mark 940. In FIG. 10, a STA transmitting a WUP may transmit four copies of the NBP WUR PPDUs 1050, 1055, 1060, 1065 over the 20 MHz channels after transmitting L-STF 1010, L-LTF 1020, L-SIG 1030, and BPSK mark 1040. The number of the duplicated NBP of the WUR PPDU may be indicated by a STA or an AP in a beacon, short beacons, WUR beacons, or other type of frames such as in the WUR element, or WUR operation element, or in WUR Action frames.

In one embodiment, a STA or an AP may transmit a bit map to indicate which of the 4 MHz channels (e.g., within a 20 MHz channel, and/or the band and the channel number of the 20 MHz channel) are being used as wake-up channels for the STA. In another embodiment, the STA may indicate how many concurrent WUP or NBPs of a WUR PPDUs it can transmit. In yet another embodiment, a STA may indicate the operating class, which may be 5 MHz or 4 MHz for the WUR channels for a certain channel number. Additionally or alternatively, the STA may indicate the band and/or the channel number of the WUR channels being used. Such indication may be included in the WUR element, operating element, and in frames such as beacons, probe responses, or other type of frames.

A STA may indicate its capabilities to receive one or more NBP of WUR PPDUs over a 20 MHz channel, or to flexibly receive WUR PPDUs over a 20 MHz band, for example, in its probe requests, (re)association request, WUR action frames, or the like. A STA or the AP may indicate the 20 MHz channel number used as WUR channels in case that it duplicates the NBPs of the same unicast or multicast WUP. For a WUR STA that may be capable of receiving WUR PPDUs flexibly over a 20 MHz channel, one or more repetitions of the NBP of the same WUR PPDU may be used as a backup in case channel condition deteriorates, or as a recovery method.

In an example, the flexible WUR PPDU transmission and reception procedure may start with a STA indicating that it is capable of receiving NBPs of the same WUR PPDU over a 20 MHz when it (re)associates with an AP, or at any time during the association (e.g., in a WUR element, or in an action frames or control or management frames). Such an indication may also be part of the WUR mode negotiation process.

The AP may indicate that it is capable of transmitting multiple copies of the NBPs of the same unicast or multicast WUR PPDU over a 20 MHz channel in WUR element, or it is transmitting multiple copies of the NBPs of the same unicast or multicast WUR PPDUs over a 20 MHz channel. The AP may indicate the operating class, band, and channel number of the 20 MHz channel used as WUR channel. In addition, the AP may indicate the number of the concurrent NBPs of a WUR PPDU that it can duplicate over a 20 MHz channel. Additionally or alternatively, the AP may indicate using a bit map or integers where the AP is duplicating NBPs of a WUR PPDU over 4 MHz channel. Such an indication may also be part of the WUR mode negotiation process.

The STA may go into WUR mode and turn off its PCR transceiver and turn on its WUR transceiver to monitor one of the 4 MHz channels of the 20 MHz wide WUR channel indicated by the AP. If a number of beacons has been missed, or the STA has received a certain number of WUR PPDUs in error, for example, indicated by the frame check sequence (FCS) process, or triggered by other events, the STA may determine that the current 4 MHz channel used by it may not have sufficient quality and may switch to a second 4 MHz channel within the same 20 MHz channel, and or in another 20 MHz WUR channel indicated by the AP.

A STA and the AP may enter WUR mode suspend mode or start a new WUR mode negotiation to re-negotiate whether flexible transmission and/or reception of NBPs of WUR PPDUs is allowed/used.

An AP, if it has decided to start or suspend duplicate transmissions of NBPs of WUR PPDUs, or decides to make changes to some general WUR parameters, may transmit a broadcast or multicast WUR PPDU to all STAs that are currently in WUR mode, or to those STAs that are currently using flexible receptions of NBPs of WUR PPDUs over a 20 MHz, or to those STAs that are currently in WUR mode and will be impacted by the change of WUR parameters, to start the negotiation of new WUR parameters.

Figure 11:
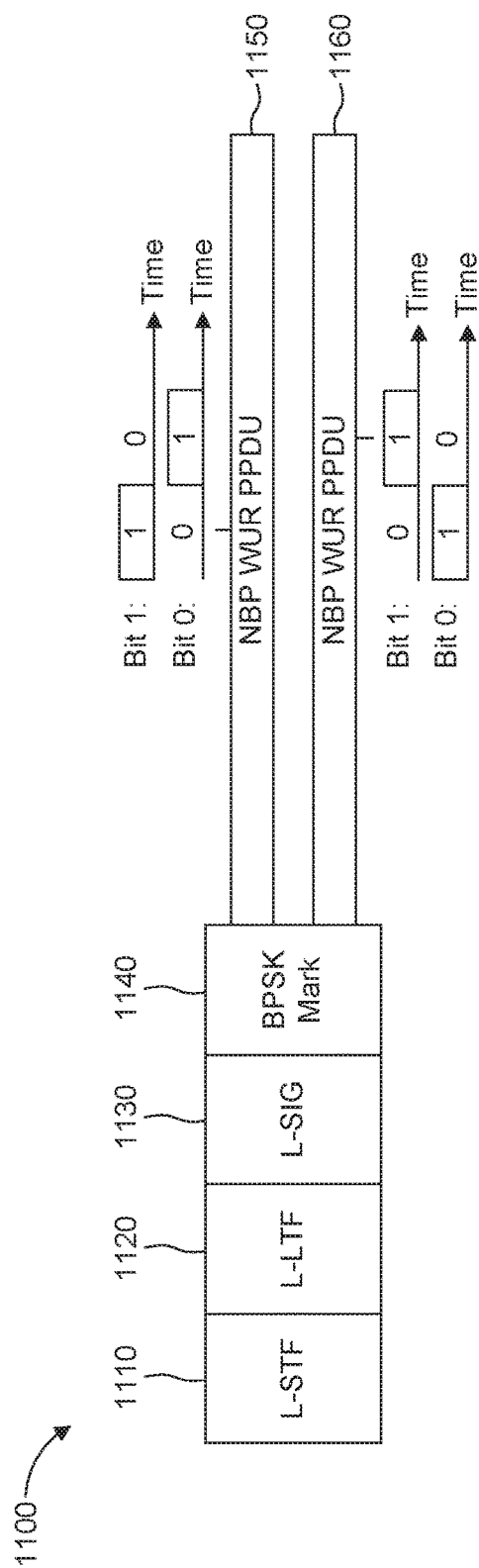
FIG. 11 is a diagram illustrating example signal configuration of multiple copies of the WUR PPDU over the 20 MHz channel with different Manchester encoders.

FIG. 11 shows an example signal configuration 1100 of multiple copies of the WUR PPDU over the 20 MHz channel with different Manchester encoders, which may be used in combination with any of other embodiments described herein. As illustrated in FIG. 11, a STA may transmit legacy preambles (i.e. L-STF 1110, L-LTF 1120, L-SIG 1130), BPSK mark 1140 and multiple copies of NBP WUR PPDUs 1150, 1160 with Manchester encoding. Manchester encoding on different sub-channels (e.g., 4 MHz channels within the same 20 MHz channels) may be different in order to maintain low peak-to-average power ratio. For example, if there are two sub-channels, Manchester coding for the first channel may be [0 1] and [1 0] for bit 1 and bit 0, respectively while Manchester coding for the second channel may be [1 0] and [0 1] for bit 1 and bit 0, respectively. In one example, a STA duplicates multiple copies of the WUR PPDUs over the 20 MHz channel with different Manchester encoders.

In another embodiment, polarity of the bits for different sub-channels may be changed. For example, if there are more than two channels, the channels may use one of the encoding options which are encoding method 1: [0 1] and [1 0] for bit 1 and bit 0 or encoding method 2: [1 0] and [01] for bit 1 and bit 0, respectively.

FIGS. 12, 13, and 14 illustrates examples signal configurations 1200, 1300, 1400 of multiple copies of narrow band protection (NBP) of the same WUR PPDU over the 20 MHz channel, which may be used in combination with any of other embodiments described herein. For example, a STA transmitting WUR beacons or discovery frame may duplicate the NBP of the WUR beacons or discovery frames, or other broadcast WUR frames over the 20 MHz channel. For example, the transmitting STA may follow the non-HT preambles (i.e. L-STF 1210, 1310, 1410, L-LTF 1220, 1320, 1420, L-SIG 1230, 1330, 1430) and BPSK marks 1240, 1340, 1440 with multiple copies of the NBP of the WUR beacons or Discovery frames or other types of WUR broadcast frames multiplexed over the 20 MHz channel. As illustrated in FIG. 12, a STA transmitting a WUP may transmit two copies of the NBP of the same broadcast WUR beacons or discovery PPDUs 1250, 1260 or other types of broadcast WUR frames over the 20 MHz channel. As illustrated in FIG. 13, a STA transmitting a WUP may transmit three copies of the NBP of the same broadcast WUR beacons or discovery PPDUs 1350, 1360, 1370 or other types of broadcast WUR frames over the 20 MHz channel. As illustrated in FIG. 14, a STA transmitting a WUP may transmit four copies of the NBP of the same broadcast WUR beacons or discovery PPDUs 1450, 1455, 1460, 1465 or other types of broadcast WUR frames over the 20 MHz channel. The number of the duplicated NBP of the WUR PPDU may be indicated by a STA or an AP in a beacon, short beacons, WUR beacons, or other type of frames such as in the WUR element, or WUR operation element, or in WUR Action frames.

In one embodiment, a STA or an AP may transmit a bit map to indicate which of the 4 MHz channels (e.g., within a 20 MHz channel, and/or the band and the channel number of the 20 MHz channel) are being used as wake-up channels, beacon channels, or WUR discovery channels for the STA. In another embodiment, the STA may indicate how many concurrent WUPs or NBPs of a WUR beacon, discovery frame, or broadcast WUR frames it can transmit. In yet another embodiment, a STA may indicate the operating class, which may be 5 MHz or 4 MHz for the WUR channels, or WUR discovery frame for a certain channel number. Additionally or alternatively, the STA may indicate the band and/or the channel number of the WUR channels, or WUR discovery channels being used. Such indication may be included in the WUR element, operating element, and in frames such as beacons, probe responses, or other type of frames.

A STA may indicate its capabilities to receive one or more NBP of broadcast/multicast WUR PPDUs over a 20 MHz channel, or receive flexibly broadcast WUR PPDUs or WUR beacons over a 20 MHz band, for example, in its probe requests, (re)association request, or the like. A STA or an AP may simply indicate the 20 MHz channel number used as WUR channels in the event that it duplicates NBPs of the broadcast WUP or WUR beacons. For a WUR STA capable of receiving WUR PPDUs flexibly over a 20 MHz channel, one or more repetitions of the NBP of the broadcast WUR PPDU or WUR beacons may be used as a backup in case channel condition deteriorates, or as a recovery method.

The flexible WUR beacon or broadcast WUR frames transmission and reception and negotiation procedure may begin with a STA indicating that it is capable of receiving NBPs of a broadcast WUR PPDU or WUR beacons over a 20 MHz when it (re)associates with an AP, or at any time during the association, (e.g., in a WUR element, or in an action frame or control or management frame). Such an indication may also be part of the WUR mode negotiation process.

The STA may go into WUR mode and turn off its PCR transceiver and turn on its WUR transceiver to monitor one of the 4 MHz channels of the 20 MHz wide WUR channel indicated by the AP. If a number of beacons has been missed, or the STA has received a certain number of WUR PPDUs in error (e.g., indicated by the FCS process, or other types of triggers has been triggered) the STA may determine that the current 4 MHz channel used by it does not have sufficient quality and may switch to a second 4 MHz channel within the same 20 MHz channel, and or in another 20 MHz channel such as WUR channel, or broadcast WUR channels indicated by the AP.

A STA and the AP may enter WUR mode suspend mode or start a new WUR mode negotiation to re-negotiate whether flexible transmission and/or reception of NBPs of broadcast WUR PPDUs or WUR beacons is allowed/used.

An AP, if it has decided to start or suspend duplicate transmissions of NBPs of broadcast WUR PPDUs or WUR beacons, or decides to make changes to some general WUR parameters, may transmit a broadcast or multicast WUR PPDU to all STAs that are currently in WUR mode, or to those STAs that are currently using flexible receptions of NBPs of broadcast WUR PPDUs or WUR beacons over a 20 MHz, or to those STAs that are currently in WUR mode and will be impacted by the change of WUR parameters, to start the negotiation of new WUR parameters.

The flexible WUR discovery procedure may require an AP indicate that it is transmitting duplicate NBPs of WUR discovery frames over 20 MHz channels. Such an indication may be included in the beacons, short beacons, in the WUR element, or WUR discovery element.

An AP may include information on its neighboring BSS or APs in its beacons, short beacons, probe responses, or other type of management or control frames. For example, an AP may include information on its neighboring BSS or APs in reduced neighbor report element, WUR discovery element, or any other type of elements, or other type of frames. Such information may include WUR channels, WUR Broadcast channels, or WUR discovery channels. Such information may also include whether that AP duplicates NBPs of unicast, multicast, or broadcast WUR frames over a wider channel (e.g., over a 20 MHz channel). If a neighboring AP duplicates NBPs of WUR discovery frames over its WUR discovery channel, or WUR channel, the information on this neighboring AP may only include the band, operating class, or channel number of the 20 MHz channel used as the WUR discovery channel, or as WUR channel. Additionally or alternatively, information may be included in a frame, such as a reduced neighbor report element, which may include a bit map for a WUR channel or WUR discovery channel to indicate which 4 MHz sub-channels may be used in the WUR channel or WUR discovery channel.

A STA may have pre-acquired knowledge of a WUR channel or a WUR discovery channel of potential future APs or BSSs. Such knowledge may be acquired through an AP that the STA has previously been or is currently associated with, through a reduced neighbor report element for example, or other type of frames such as management or control frames. Alternatively or additionally, the STA may have acquired knowledge about the WUR channel or WUR discovery channel of a potential future AP or BSSs through a previous association with that AP. Alternatively or additionally, the STA may have received information about one or more APs in an area associated with a location or provide to them by its carrier. The STA may monitor one of the sub-channels of the WUR channel or WUR discovery channel, which may have been indicated additionally using a bitmap. If the STA could not detect a WUR beacon or WUR discovery frames either for association or for localization, after a certain interval, it may switch to another sub-channel in the WUR channel or WUR discovery frames to discover valid WUR beacons or WUR discovery frames.

The STA may subsequently conduct association or localization procedures following the detection of valid WUR beacons or WUR discovery frames from the desired APs or BSSs.

In one embodiment, sync sequences may be inserted in the extension band that surrounds the narrow band WUR PPDU. The STA may transmit over most of the 20 MHz bandwidth, filling the channel with other transmissions, to ensure that other devices in the same general area can use energy detection to determine that the 20 MHz channel is in use. As described previously, there may be a transmission of the same unicast WUPs, and there may be a transmission of WUR beacons and discovery frames over the 20 MHz band. In comparison, in one embodiment WUR synchronizing frames may be transmitted using the unused carrier in the 20 MHz bandwidth. These synchronization frames may also be transmitted in conjunction with the WUR PPDU, WUR beacons, and WUR discovery frames thereby allowing the STA to fill the channel with energy on most carriers, and ensuring that a receiver can detect the channel is busy using energy detection techniques. The various frames may be multiplexed in the frequency domain. The STA may determine which carriers are used for each type of transmission. Hence, whenever a STA sends a WUR PPDU, it may also send WUR beacon(s), WUR discovery frame(s), and/or WUR synchronization frame(s).

The synchronization frame may contain the same information contained in the WUR-sync field, it may contain multiple copies of the WUR-sync field to allow it to fill the full synchronization frame, or it may contain different synchronization information. It may also contain a time synchronization function (TSF) timer related information so that STAs may use WUR transceiver to bring their TSF timer to synchronization with that at the transmitting STA or AP.

The STA may also inform the WURs it is serving as to what the channel configuration is and on which carriers each of the various transmissions can be found. This may give the WUR additional freedom to choose when to wake up to obtain beacon, discovery, or sync information, as these signals will be more frequently available since they are now present with each STA transmission. The sending of these additional signals on carriers other than the WUR PPDU carriers may cause the WUR to be tuned to the carriers being used by one of these additional signals and therefore not the WUR PPDU carriers. If the WUR is not tuned to the WUR PPDU carriers, it could potentially not receive a WUR PPDU which is addressed to it. There are several techniques to either ensure or reduce the probability that the WUR is not tuned else when a WUR PPDU addressed to it is transmitted.

In one case, if there are two (or more) WUR present, then one WUR can always be set to receive the WUR PPDU and the second WUR can be activated when it is desired to receive one of the additional signals. Otherwise the second WUR may be inactive and hence use no additional power.

In another case, if there is only one WUR present, then there may be a restriction as to how often the WUR can tune away from the carriers used by the WUR PPDU and monitor other channels or sub-channels. This restriction may be configured by the AP or it may be configured by the WUR. Either way, the probability that the WUR will miss a WUR PPDU should be minimized. One such configuration might state that a WUR must be tuned to the WUR PPDU carriers for 95% of the time (or some other %). The requirement may be standardized or configured by the AP during the WUR mode setup exchange. If it is configured by the AP during the WUR mode setup exchange, additional fields may be added to the WUR mode setup frame.

For the case where there are two or more WURs, it is possible that the WUR PPDU fields may be arranged so that the WUR-sync fields are transmitted on one set of carriers and the WUR-data fields are transmitted on a different set of carriers. This may allow the duration of the WUR PPDU to be decreased by the duration of the WUR-sync field.

One method for generating on-off keying (OOK) symbols that may occupy the bandwidth of 4 MHz with Manchester coding, may be to populate the center 13 tones with a frequency domain sequence, and then the generated time domain signal after IFFT may be masked with 0 as the off duration. This method may expand the signal bandwidth compared to the original OFDM signal which satisfies the requirement of adjacent (20 MHz) channel interference. The WUR signal generated in this manner may be in the center of the 20 MHz channel and is far from neighboring the 20 MHz channel, so the adjacent channel interference (ACI) introduced is negligible. However, if a signal is inserted in the expansion band outside the center 4 MHz, it may be closer to the neighboring channel and the OOK symbol generated by masking may have a bigger impact to the neighboring 20 MHz channels.

FIG. 15 illustrates an example combination of unmasked and masked signals, which may be used in combination with any of other embodiments described herein. To avoid the signaling bandwidth expansion to neighboring 20 MHz channels, the masking of the off duration signals inserted in the extension band may be skipped, at least for the tones closer to the adjacent channels, as illustrated in FIG. 15. In FIG. 15, the masked signal (i.e. WUR signal+signal for ED purpose generated with OOK masking) 1510 and the regular OFDM signal (i.e. signal generated for ED purpose without OOK masking) 1520 may be combined to form a final 20 MHz signal 1530. With this procedure, the only signal bandwidth expansion may be introduced by the masking of the WUR signals (or the signal for the ED purpose which is far away from the adjacent channel).

One issue that may be introduced by a WUR signal is that because the signal has a narrow bandwidth, it may not carry sufficient energy for energy detection.

Although the WUR signal may be prepended by a legacy 11a SIG to indicate its duration, if a BSSx uses BSSy's WUR operating channel as its secondary channel, the legacy SIG of the WUR packet from BSSy may not help STAs in BSSx determine the secondary channel busy duration, unless the legacy SIG coincides with the point interframe space (PIFS) duration of the secondary channel CCA performed by a BSSx STA.

For a WUR AP, in addition to continuously monitoring the CCA/NAV in the primary channel, it may also need to continuously monitor the CCA/NAV for the WUR operating channel. Because of this extra requirement, the AP may be able to determine the WUR operating channel's true CCA status without completely relying on ED.

By aligning neighboring BSS's WUR operating channels, it may minimize/eliminate the chances that an AP initiates/grants a secondary channel transmission (to/from AP) prior to which only ED is performed for CCA, and the channel is used by a neighboring BSS as a WUR operating channel.

Additionally, an AP may require request to send (RTS) and/or clear to send (CTS) BW negotiation for the BSS. For a transmit opportunity (TXOP) initiated by a non-AP STA, the AP may reply with a CTS restricting secondary channel usage if the AP detects the WUR secondary channel is busy.

In one instance, two data rates may be used for 802.11ba devices, 62.5 kbps and 250 kbps; each data rate may be identified by a sync sequence in the WUR preamble. It is conceivable that a STA may not be able to decode the wake-up radio packet (WUP) transmitted using the high data rate if it is located farther away from the AP, or it has moved out of the range of the AP's BSS. In some cases, if a STA cannot decode a packet, it needs to back off for extended interframe space (EIFS) and then conduct medium access. Since a WUR transceiver of a STA may not need to transmit, it may need a different procedure to recover from the receive fault. In addition, an AP may need to conduct recovery as well if it failed to wake up a STA, in order to support STA or traffic delay requirement. As discussed herein, there may be procedures for WUR STAs and APs for fault recover if a WUP is not correctly received.

For a non-AP STA to accurately estimate which data rate is usable for a WUR, it may collect the packet error rate (PER) status of an intended/overheard WUP or WUR packet with a specific rate from its associated AP.

However, for a WUP or WUR packet in error, the non-AP STA may not distinguish whether it is from its associated AP because the BSSID may be implicitly embedded in the WUR packet (in Wake Up ID (WID) or Cyclic Redundancy Check (CRC)).

To avoid this, the S sequence (i.e. a component for the SYNC sequences used for the WUR SYNC field) or the low data rate and high data rate sync sequences may be BSS specific for a WUP or WUR packet that is intended for associated STAs, such that an associated STA could determine with a high likelihood that an erroneous packet is or is not from its associated AP, as well as the data rate. The STA may use this particular sequence to detect WUPs or WUR packets without increasing the number of hypothesis.

Figure 16:
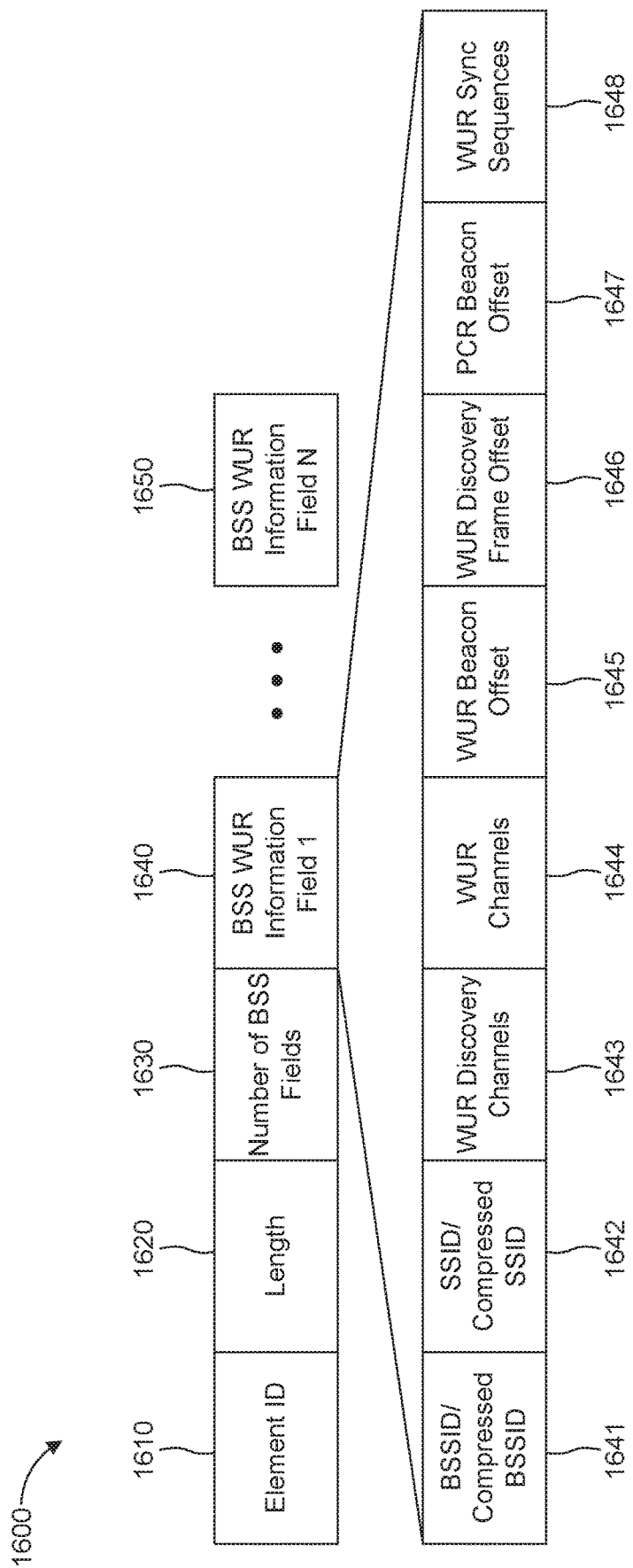
FIG. 16 is a diagram illustrating an example WUR Information element.

FIG. 16 illustrates an example WUR information element 1600, which may be used in combination with any of other embodiments described herein. An AP may provide information regarding WUR operations in its neighboring BSSs (e.g., neighboring APs) to its associated STAs. For example, an AP may provide WUR operation information for its neighboring BSSs (e.g., neighboring APs) in a reduced neighbor report element, a WUR information element 1600, WUR discovery element, any other new or existing element in a management frame, a control frame, or other types of frames, such as beacon, short beacons, WUR beacons, WUR Discovery frames, and the like.

The WUR information element 1600 or the WUR discovery element that includes WUR operation information of the transmitting AP and/or neighboring BSSs or APs may be included in a management frame, a management and extension frame, a control frame, a WUR frame, or any other types of frames. Examples of the management frame may include, but are not limited to, a beacon frame, an association request frame, an association response frame, a reassociation request frame, a reassociation response frame, a probe request frame, and a probe response frame. Examples of the WUR frames may include, but are not limited to, a WUR beacon frame, a WUR wake-up frame, a WUR vendor specific frame, and a WUR discovery frame. As used herein, the term WUR information element and WUR discovery element may be interchangeably used throughout this disclosure.

In another embodiment, one or more fields of the BSS WUR information fields 1640, 1650 may be included in the reduced neighbor report element (e.g., in the TBTT information set), or in any other existing or new element.

As illustrated in FIG. 16, the WUR Information element 1600 may include one or more of the following information or fields: element ID 1610 and length 1620, number of BSS fields 1630, and/or BSS WUR Information field 1-N 1640, 1650. The element ID 1610 and length 1620 may indicate that the element is a WUR information element and the length of the WUR Information element. The number of BSS fields 1630 may indicate the total number of BSS fields included in the current element or fields.

Each of the BSS WUR Information field 1-N 1640, 1650 may include the WUR information of a neighboring BSS/AP, which may include one or more fields. A BSSID/compressed BSSID field 1641 may include the ID of the neighbouring BSS/AP, which may be the BSSID, compressed BSSID, partial BSSID values, or BSSID based information embedded in WUR frames. The BSSID, compressed BSSID, or partial BSSID may be used to correctly decode a WUR frame.

A SSID/Compressed SSID field 1642 may indicate the SSID of the neighboring BSS/AP, which may be the SSID or compressed SSID. The SSID/Compressed SSID 1642 may be used to detect or decode the WUR beacons or WUR Discovery frames.

WUR discovery channels field 1643 may indicate one or more WUR discovery channels used by the transmitting AP and/or neighboring BSS/AP, such as operating class, band, and channel numbers of the WUR discovery channels. The WUR discovery channels may also be used to transmit the WUR discovery frames by the transmitting AP and/or neighboring BSSs/APs. Additionally, there may be an indication whether a neighboring AP is capable of duplicating narrow band transmissions (NBTs) of WUR discovery frames or WUR beacons over a wider bandwidth. Alternatively or additionally, a bitmap or other indication of 4 MHz sub-channels may be indicated in a wider channel, such as one of the 20 MHz channels, which are used as the WUR Discovery channels.

WUR Channels field 1644 may indicate one or more WUR channels and/or WUR broadcast channels used by the neighboring BSS/AP, such as operating class, band, and channel numbers of the WUR channels and/or WUR broadcast channels. The WUR channels may be used to transmit the WUR frames by the transmitting AP and/or neighboring BSSs/APs. Additionally, there may be an indication whether a neighboring AP is capable of duplicating the NBTs of unicast, multicast, or broadcast WUR frames or WUR beacons over a wider bandwidth. Alternatively or additionally, a bitmap or other indication of 4 MHz sub-channels may be indicated in a wider channel, such as one of the 20 MHz channels, which are used as the WUR channels or broadcast WUR channels.

WUR beacon offset field 1645 may indicate the offset in time at which the neighboring AP may transmit its WUR beacons. Such an offset may be relative to the current AP's PCR beacon target beacon transmission time (TBTT), WUR beacon TBTT, current AP's discovery frames target transmit time, to the AP's time synchronization function (TSF) timer, or any other time references.

WUR discovery frame offset field 1646 may indicate the offset in time at which the neighboring AP may transmit its WUR discovery frames. Such an offset may be relative to the current AP's PCR beacon TBTT, WUR beacon TBTT, current AP's discovery frames target transmit time, to the AP's TSF timer, or any other time references.

PCR beacon offset field 1647 may indicate the offset in time at which the neighboring AP may transmit its PCR beacons. Such an offset may be relative to the current AP's PCR beacon TBTT, WUR beacon TBTT, current AP's discovery frames target transmit time, to the AP's TSF timer, or any other time references.

WUR Sync Sequences field 1648 may indicate the WUR sync sequences that are used by the neighboring AP/BSS so that the STA may detect whether a WUR frame is meant for the STA or not. The WUR sync sequences may include number or index of the WUR sync sequence used to indicate high data rate or low data rate.

In one embodiment, an AP may provide the WUR information of its own or neighboring BSSs/APs to its associated STAs via a management frame such as a beacon or a probe response fame. Specifically, the management frame may include a WUR discovery element that is used to advertise the WUR discovery channels on which the AP transmits WUR discovery frames. The WUR discovery element may include one or more WUR AP information subfields such as a WUR AP information set. The WUR AP information set subfield may include one or more WUR AP information subfields. Each of the WUR AP information subfields may identify the WUR APs that transmit WUR discovery frames on a particular WUR discovery channel. For example, the WUR AP information subfield may comprise WUR discovery operating class field, WUR discovery channel field, WUR AP list field or the like. The WUR discovery operating class field may indicate the operating class in use for transmission of WUR frames by the WUR APs listed in this subfield. The WUR discovery channel field may indicate the channel in use for transmission of WUR discovery frames by the WUR APs listed in this subfield. The WUR AP list field may include one or more WUR AP parameters subfields. Each WUR AP parameters subfield may identify one WUR AP, which may be the WUR AP transmitting this WUR discovery element itself or may be a neighboring WUR AP.

In another embodiment, the AP may provide the WUR information of all neighboring APs/BSSs to its associated STAs. In yet another embodiment, the AP may only provide the WUR information of all neighboring APs/BSSs that are using their PCRs, WUR channels, or WUR Discovery channels that may overlap with the transmitting AP's own PCR channels, WUR channels, or WUR Discovery channels.

The procedures for disseminating WUR related information about neighboring APs may start with an AP indicating its own WUR channels or WUR discovery channels. The WUR channels may include unicast, multicast or broadcast WUR channels. The WUR channels or WUR discovery channels may be included in a WUR element (e.g., WUR information element or WUR discovery element), or any other element. Such a WUR element may be transmitted in management, control or any other types of frames such as beacon, short beacons, and/or WUR mode action frames. An AP may indicate the WUR channels used for a particular STA during the WUR mode negotiation signaling, or in WUR mode suspend negotiations. The AP may indicate whether it is duplicating NBTs of WUR PPDUs over multiple sub-channels over the 20 MHz channels. The AP may indicate the operating class, band, channel numbers of the WUR channels; it may also indicate the number of sub-channels within the 20 MHz channels that are used as WUR channels or WUR discovery channels. Alternatively or additionally, the AP may include a bitmap or other indication to indicate which sub-channels are used as WUR channels or WUR discovery channels within a wider channel, such as a 20 MHz channel.

The AP may also indicate WUR information of neighboring BSS or APs in management frames, control frames, action frames, WUR frames or any other types of frames. Examples of such frames may include, but are not limited to, beacons, short beacons, probe response frames, (re)association response frames, and WUR action frames. The WUR information of neighboring BSSs or APs may be related to WUR channels or WUR discovery channels in which the neighboring BSSs or APs are going to use. The AP may indicate WUR information in a reduced neighbor report as illustrated in FIG. 16, a WUR discovery element as described above, or other type of information fields. Such WUR information may be acquired by the AP through monitoring its own WUR channels or WUR discovery channels, or through monitoring beacons or other types of frames transmitted by neighboring APs, through coordination procedures, through a central server or through DS, or acquired from data servers regarding certain locations. In one embodiment, the AP may provide WUR information on one or more BSSs/APs in its beacons, probe response frames and/or WUR announcement frames so that the STAs associated will know of the presence of the WUR channels or WUR discovery channels as well as other WUR parameters used by the neighboring BSSs/APs. In another embodiment, a WUR channel, WUR discovery channel or WUR broadcast channel may be assigned to a particular WUR STA during WUR mode negotiation or WUR mode suspend negotiations; the AP may provide WUR information of neighboring BSSs/APs to the STA during the WUR mode negotiation or WUR mode suspend negotiation process. In another embodiment, the AP may provide, to the STA, the WUR information of neighboring BSSs/APs whose WUR channel, PCR channels, and/or WUR discovery channels overlap or partially overlap with the WUR channels assigned to the STA.

An example procedure for fault recovery may begin with an AP providing a WUR STA WUR information of neighboring BSSs/APs. The neighboring BSS/AP may have WUR channels, PCR channels, or WUR discovery channels that may overlap with the WUR channels used by the transmitting AP or assigned to the STA.

The AP may indicate a number N to the STA which may be a threshold of the number of WUR frames that are received in error. Such a number N may also be a threshold of the number of low rate WUR frames received in error. Such a number N may also be a threshold of the number of (e.g., low rate) frames from its own BSS received in error. Alternatively or additionally, such a number N may be autonomously determined by the STA or provided to the STA.

After a STA successfully negotiates with the AP a WUR mode, the STA may turn on its WUR transceiver and turn off its PCR transceiver, thereby entering into WUR mode to monitor WUR frames. The WUR transceiver may use the WUR information provided by the AP to determine whether a WUR frame has been received, or a WUR frame has been received from its own AP or neighboring AP. For example, the WUR transceiver may use the WUR sync sequences used by neighbor BSS/AP to determine whether a valid (e.g., low rate) WUR has been received. In another example, the WUR transceiver may use the BSSID/compressed BSSID/partial BSSID info to determine whether a received WUR frame is valid by checking the frame check sequence (FCS) and whether a received WUR frame is sent by its own AP.

The STA may increase a counter every time if it cannot correctly decode a (e.g., low rate) WUR frame, cannot correctly decode a (e.g., low rate) WUR frame that is sent by its own AP, or cannot correctly decode a (e.g., low rate) WUR frame, depending how the threshold number N is defined. If the counter is equal to or has exceeded the threshold number N, for example, over a certain time interval, the STA may turn on its PCR transceiver and try to communicate with the AP. If the AP is still within range, the STA may request WUR sounding procedures to be conducted to confirm the WUR channel assignments. If the AP is out of range, the STA may use detected WUR discovery frames, or PCR beacons to conduct discovery and association processes with a new AP.

To address the possible scenario where the STA may fail to be woken up by the AP, several procedures may be defined. For example, the AP may have a time out interval defined. If the AP may not receive any response during that interval, it may be able to: adjust the transmission data rate for the STA over WUR; perform retransmission over WUR; and/or change the WUR channel.

In one example, the AP may define a user dependent time out interval to take one or more above mentioned actions. For example, for WTRUs which may have strict power saving requirements, the AP may assign shorter time out intervals. In another example, the AP may define QoS dependent time out intervals. If the AP has traffic with high QoS requirement for the WTRU, the AP may use shorter time out intervals. In another example, the AP may define rate dependent time out intervals. For example, for a higher WUR data rate, the AP may use a shorter time out interval. Once the time out interval may be reached, the AP may retransmit the WUP with lower WUR data rate.

Figure 17:
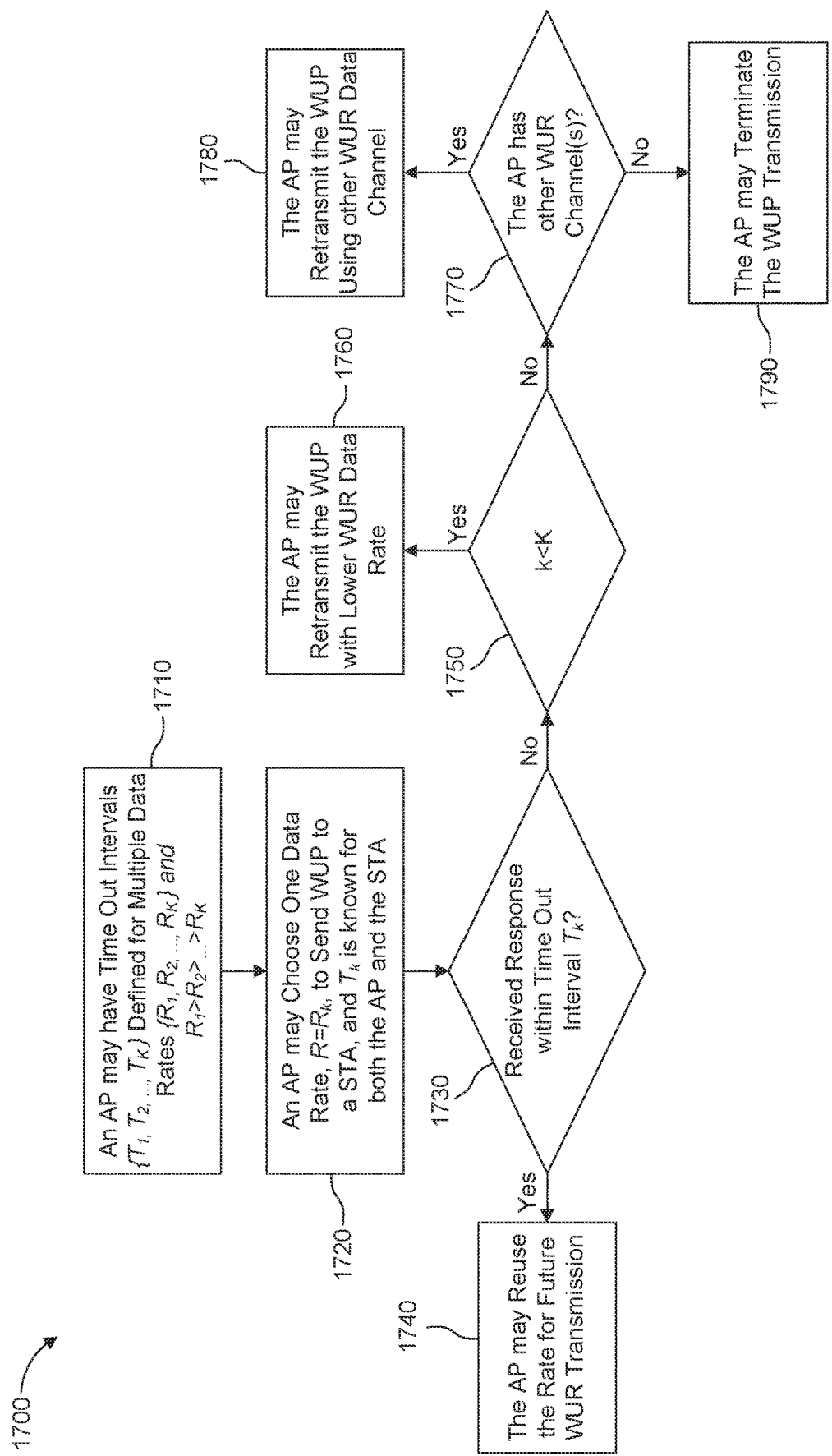
FIG. 17 is a diagram illustrating an example AP procedure with rate dependent time out intervals.

FIG. 17 illustrates an example AP procedure 1700 with rate dependent time out intervals, which may be used in combination with any of other embodiments described herein. As illustrated in FIG. 17, at step 1710, an AP may have time out intervals $\{T_1, T_2, \ldots, T_K\}$ defined for multiple data rates $\{R_1, R_2, \ldots, R_k\}$ and $R_1 > R_2 > \ldots > R_k$. K may be the number of data rates supported over WUR. The AP may have the mapping between the time out intervals and the WUR data rates explicit or implicit. In an explicit method, the mapping between the time out intervals and the WUR data rates may be explicitly signaled over PCR management frames or control frames or WUR parameter negotiation frames over PCR. Alternatively or additionally, the mapping may be sent over WUR management frames or control frames over WUR. In an Implicit method: the mapping between the time out intervals and the WUR data rates may be pre-defined or specified. The AP may signaled the WUR rate and both the AP and the STA may know the corresponding time out interval to be used. The AP and STA may start the timer when they complete the WUR parameter negotiation exchange over PCR. Alternatively or additionally, the AP and STA may start the timer when the AP may finish transmitting a WUR frame to the STA using the rate.

At step 1720, in WUR, an AP may choose one data rate, $R=R_k$, to send WUP to a STA, and $T_k$ may be known for both the AP and the STA. At step 1730, if the AP receives a response from the STA within time out interval $T_k$, then the AP may reuse the rate for future WUR transmissions at step 1740. Otherwise, the AP may check when k is less than K at step 1750. If k is less than K (i.e. k<K) at step 1750, the AP may retransmit the WUP with lower WUR data rate at step 1760. If k is not less than K (i.e. k=K) at step 1750, the AP may check whether there is another WUR channel available for transmission at step 1770. The AP and the STA may have negotiated the WUR channel switching order before the STA enters WUR mode. If the WUR channel switching has been negotiated, then the AP may retransmit the WUP using other WUR channel at step 1780. Otherwise, the AP may terminate the WUR transmission at step 1790.

For the WUR, the STA may know the WUR data rate used by the AP. This may be achieved by the AP and the STA negotiating the WUR data rate over PCR, or the AP may choose the highest data rate for the initial transmission over WUR.

If a STA is not woken up after some time duration (this may be STA specific or general to the BSS), the STA may need to take action to verify that it is because there is no data meant for it rather than because it is unable to decode a wake-up signal (WUS) sent from the AP. The WUR may then wake up the PCR transceiver and the STA may choose one of the following: fall back to the PCR power save procedure; request that the AP send a WUS to its STA as a test; request that the AP sends a robust WUS; and/or request for a change in the WUR channel. For any of these options, the WUR may send information on the last valid WUS or WUR beacon it received to the PCR transceiver.

Figure 18:
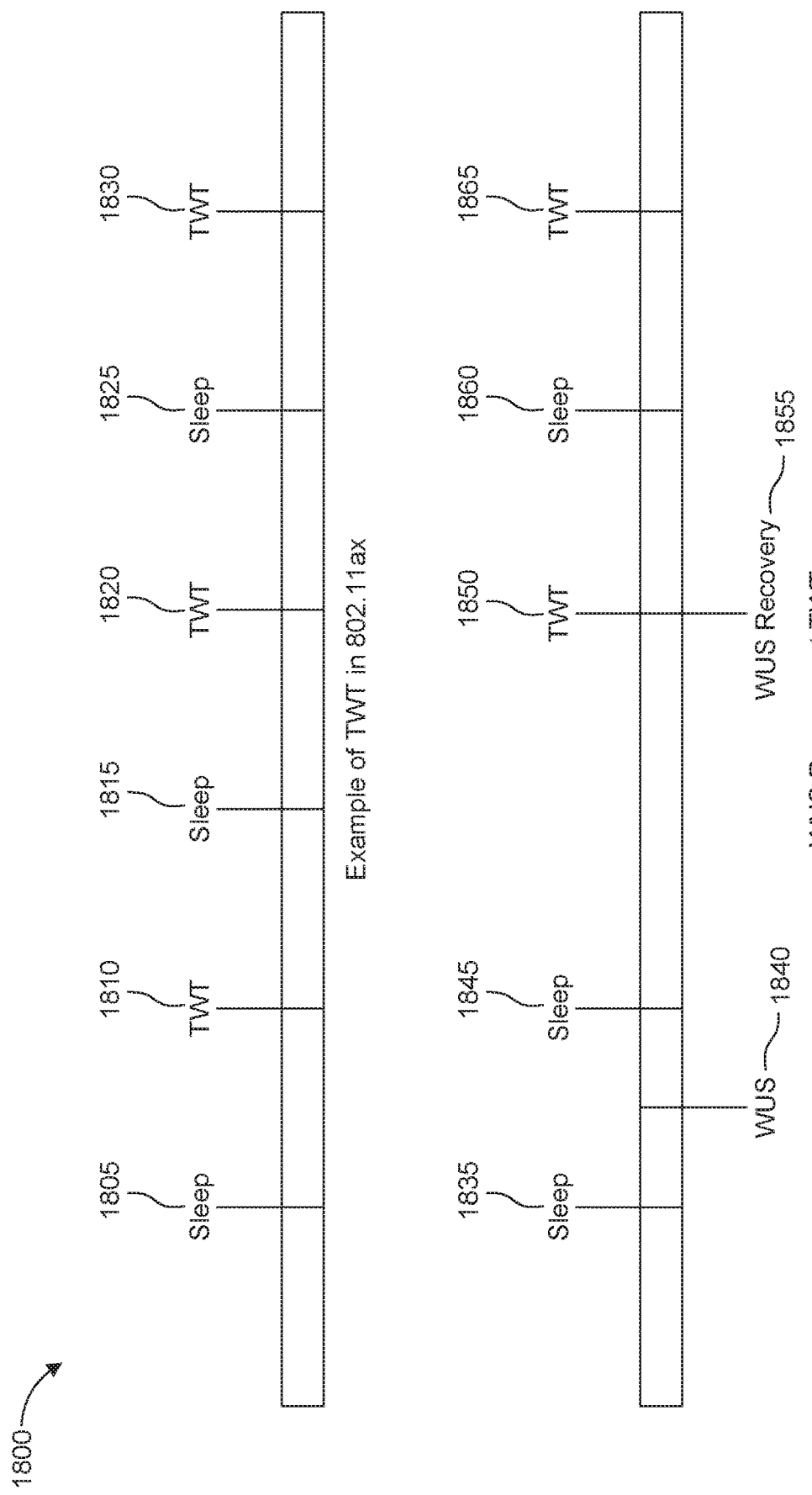
FIG. 18 is a diagram illustrating an example STA procedure for fault recovery.

FIG. 18 illustrates an example STA procedure 1800 for fault recovery, which may be used in combination with any of other embodiments described herein. In one embodiment involving the fall back to the PCR power save procedure, the PCR may resume its power save procedure but modified in the case that a WUR is enabled. In an example of 802.11ax, the WUR transceiver may be in sleep modes 1805, 1815, 1825, but turn on the PCR transceiver at the target wake-up time (TWT) set 1810, 1820, 1830. In another example of WUS recovery 1855 at TWT 1850, the WUR transceiver may be in sleep modes 1835, 1845, 1860, but turn on the PCR transceiver at the TWT set 1850, 1865 in the PCR when there is no received WUS 1840.

In another example, the WUR signal to the PCR may include the difference between the wake-up time and the time the last valid WUS was sent to the STA. An 802.11ax/ah STA that is implementing a TWT power saving algorithm may modify the TWT by the difference. For instance, if the WUR just received a WUS, the TWT interval may be reset in the PCR (i.e., the duration between wake up times is modified by duration −0 msec). In another example, if the WUR has not received a WUS in the last 10 msecs, the TWT interval may be modified in the PCR (i.e., the duration between wake-up times is modified by duration −10 msec resulting in the main radio waking up based on the power saving algorithm much faster). As such, if the STA has not received a signal for a long time, the PCP power management system may take over as a back-up.

In one embodiment, the WUR may send a WUS to the STA indicating that there has been no receipt of a WUS for a certain duration of time. The PCR may then switch to the PS-Poll mechanism in which the STA wakes up at a beacon time and listens to the AP delivery traffic indication message (DTIM). If there is data queued, it may then send a power save poll (PS-Poll) to the AP to request any data that may have been queued. Alternatively or additionally, the STA may use the unscheduled automatic power save delivery (U-APSD) mechanism, in which it may send any packet to the AP and it cross references the STA information to see if any information is queued, then sends the information to the STA. It is noted that this procedure may also trigger any of the additional remediation to the WUR transmissions discussed below.

It is noted that these two methods are STA initiated. The AP may initiate a power save multi-poll procedure to wake up the STA if there is no response based on signaling by the WUR.

In another embodiment, the WUR may send a request to the PCR to send a test WUS signal request to the STA as a test. If the WUR is able to decode the signal, an ACK may be sent by the PCR to the AP indicating that the signal was received. The request may include a list of the WUR receive parameter to ensure that the AP has the correct values. It may also include a target time (or target time duration) within which it expects the transmission. In this case, both the PCR and the WUR may be on and receiving at the same time. If there is a timeout, the WUR may re-negotiate its transmission parameters with the AP or request for a change in WUR channels.

Figure 19:
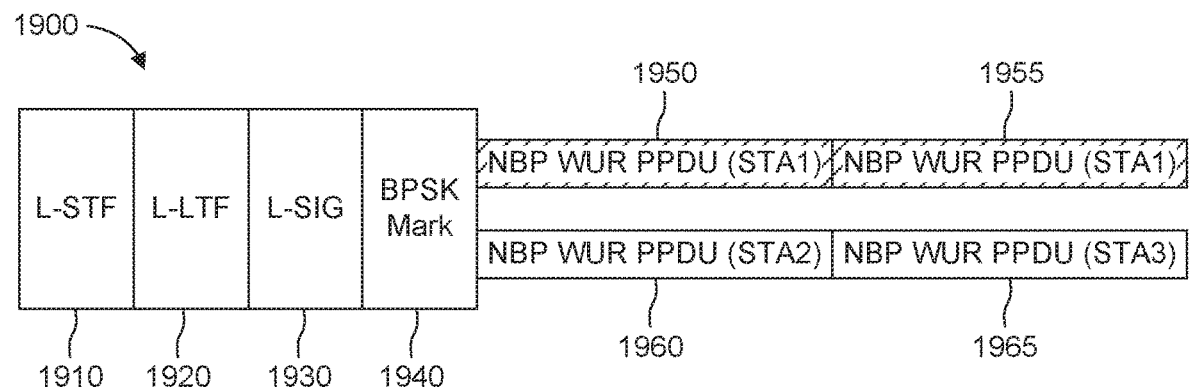
FIG. 19 is a diagram illustrating an example signal configuration with multiple non-concurrent transmission with simple repetition.
Figure 20:
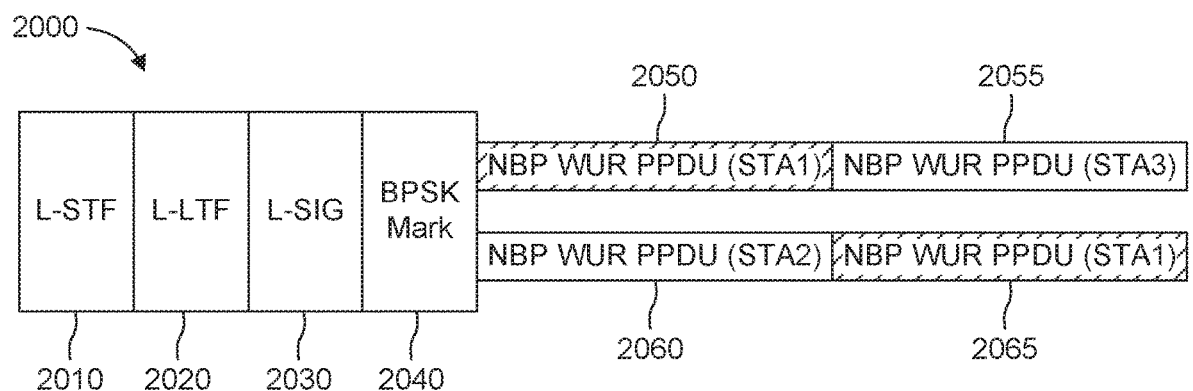
FIG. 20 is a diagram illustrating an example signal configuration with multiple non-concurrent transmission with hopping.

In another embodiment, if the WUR of a STA is able to establish that there may be connectivity between the STA and the AP (e.g., by being able to successfully receive beacons), the WUR may request for robust WUS transmission. This may be by one or more processes. As illustrated in FIG. 8, there may be a request for multiple, concurrent transmissions of the unicast WUPs within the same 20 MHz band or across multiple 20 MHz bands. It is noted that the WUR may need to be able to decode the concurrently transmitted packets. FIG. 19 illustrates an example signal configuration 1900 with multiple non-concurrent transmissions with simple repetition, which may be used in combination with any of other embodiments described herein. As illustrated in FIG. 19, in case that the first transmission of the NBP WUR PPDUs for STA 1 1950 is not good, the same NBP WUR PPDU for STA 1 1955 may be repeated over the same subchannel after the L-STF 1910, L-LTF 1920, L-SIG 1930, and BPSK mark 1940 are transmitted. FIG. 20 illustrates an example signal configuration 2000 with multiple non-concurrent transmissions with hopping. There may be a request for multiple, non-concurrent transmissions of the WUPs within or across multiple 20 MHz bands. The transmission may be similar or the same as FIG. 19, or they may be hopped as in FIG. 20 with a specific hopping pattern. As illustrated in FIG. 20, In case that a particular subchannel transmitting the NBP WUR PPDU for STA 1 2050 is not good, the same NBP WUR PPDU for STA 1 2065 may be transmitted over a different subchannel by hopping after the L-STF 2010, L-LTF 2020, L-SIG 2030, and BPSK mark 2040. With the hopping pattern, the WUR setup procedure may signal the hopping pattern used.

In one example of a 802.11ba frame format, following the 20 MHz non-HT preamble and the additional 20 MHz BPSK OFDM symbol, the narrow band portion of a WUR PPDU may be composed by a synchronization (SYNC) field and a data field. In the data field, it may include the signal/control for the data information. The signal/control information may include wake-up ID, WUR group ID, wake-up purpose ID, or the like. This information may need to be decoded with information data or before information data, which in one example may unnecessarily consume the power of the WUR.

In one embodiment, the length of the SYNC field may be used to indicate the data rate of the data field. When the data field uses the low data rate, the duration of the SYNC field may be 128 µs. When the data field uses the high data rate, the duration of the SYNC field may be 64 µs.

Additionally, when the data field uses the high data rate, the structure of the SYNC field may be $\overline{S}$, where S is a sequence of 32 bits, and $\overline{S}$ is the complementary sequence of S. When the data field uses the low data rate, the structure of the SYNC field may is [S, S].

Figure 21:
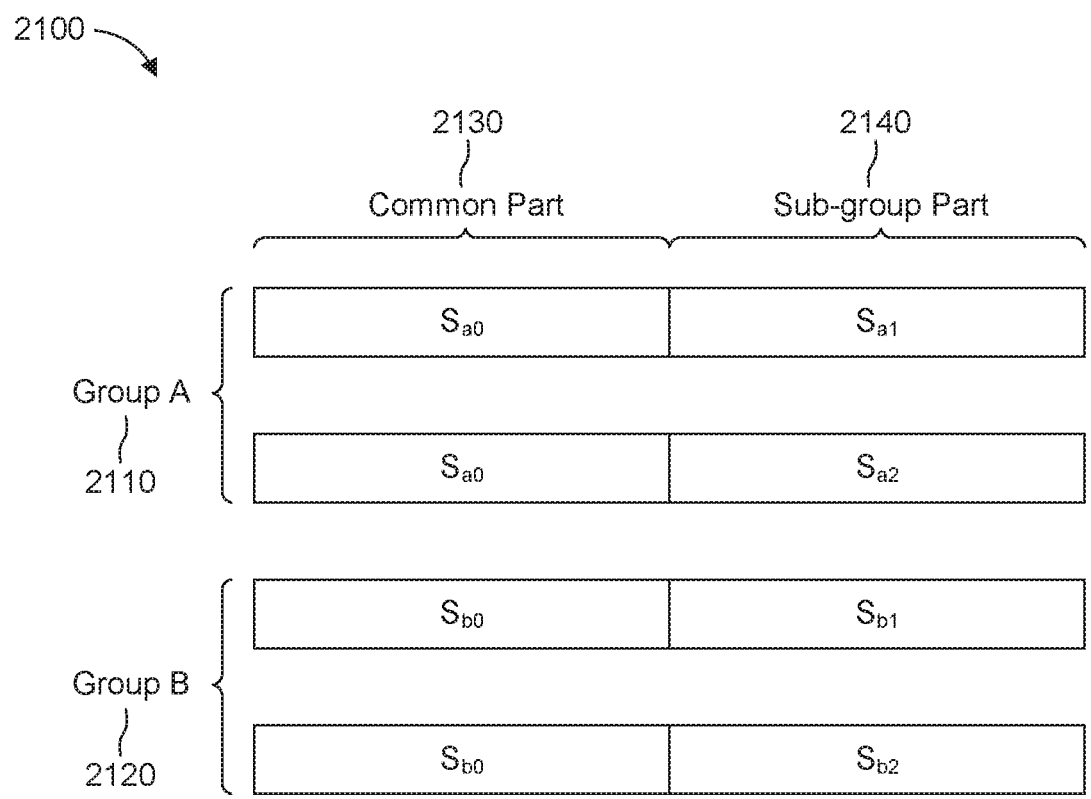
FIG. 21 is a diagram illustrating an example construction SYNC field with different groups and subgroups.

Since the length of the SYNC sequence may be quite long (e.g., minimum 32 bits) and every WUR may need to be synchronized with its AP regardless if its main radio needs to be woken up, an AP may send one of a set of orthogonal or low-cross-correlated SYNC sequences for signaling other control information, such as WUR group ID or wake-up purpose ID, before processing the data field. Those SYNC sequences may be further partitioned into subgroups, by constructing each sequence with a common part (i.e. same for all sequences in the group) and subgroup part (i.e. different for all sequences in the group). Similar partitions may be constructed if the group needs to be further partitioned. FIG. 21 illustrates an example an example construction 2100 of SYNC field with different groups and subgroups. As illustrated in FIG. 21, the SYNC sequences $S_{a0}$, $S_{a1}$, $S_{b0}$, and $S_{b1}$ may be divided into two groups, group A 2110 and group B 2120. The group A 2110 may include the SYNC sequences $S_{a0}$, and $S_{a1}$. The group B 2120 may include the SYNC sequences $S_{b0}$, and $S_{b1}$ In addition, each group has two subgroups, common part 2130 and sub-group part 2140. The common part 2130 may include $S_{a0}$ and $S_{b0}$. The sub-group part 2140 may include $S_{a1}$ and $S_{b1}$.

In one example, many IoT devices may be equipped with only a small battery and may be expected to have a very long operational life. The reduction of energy consumption may be crucial for the expected operation duration for such devices. Network discovery of suitable APs may consume a lot of energy if the IoT devices must turn on their PCR in order to discover such APs. An issue may exist regarding how to perform AP (network) discovery with minimum energy consumption and then provide a means of efficient association with the appropriate BSS and AP for a low power device that contains a WUR.

Embodiments for power efficient network discovery and association are described herein. A WUR capable device (i.e. WUR STA) may use the WUR receiver (WURx) as an independent receiver (i.e. without using the PCR) to discover a suitable network such as BSS or AP to associate with. This may be called the "WUR only discovery mode. In this mode, the WUR STA may activate or turn on its WUR transceiver and may deactivate or put its PCR transceiver in a sleep state, deep sleep state, doze state, or completely unpowered (i.e. shut-off) state. In addition, the WUR STA may also put its WURx into a duty cycle mode and may only turn on its WURx for certain duration (e.g., WURx on time) with a certain periodicity or duty cycle in order to achieve higher energy efficiency. Furthermore, the WUR STA may turn on its WURx when triggered by an event such as roaming from on site to another site. When the WUR transceiver is active (e.g., receiving WUR frames) the WUR STA may receive WUR beacon frames, WUR wake-up frames, WUR discovery frames, or WUR vendor specific frames that provide information about the WUR AP in the reception range of the device containing the WURx.

Figure 22A:
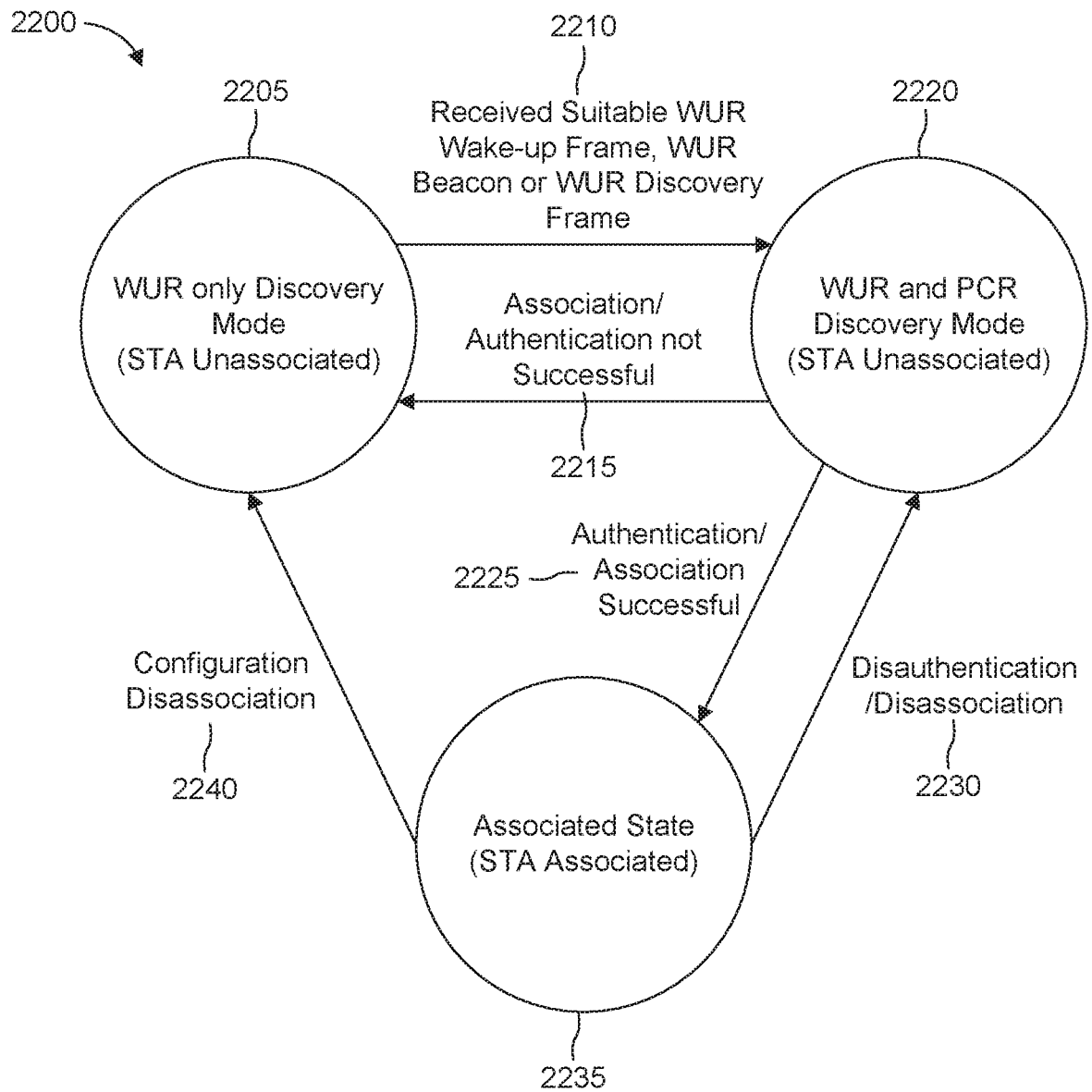
FIG. 22A is a diagram illustrating an example state transition for WUR only discovery mode.
Figure 22B:
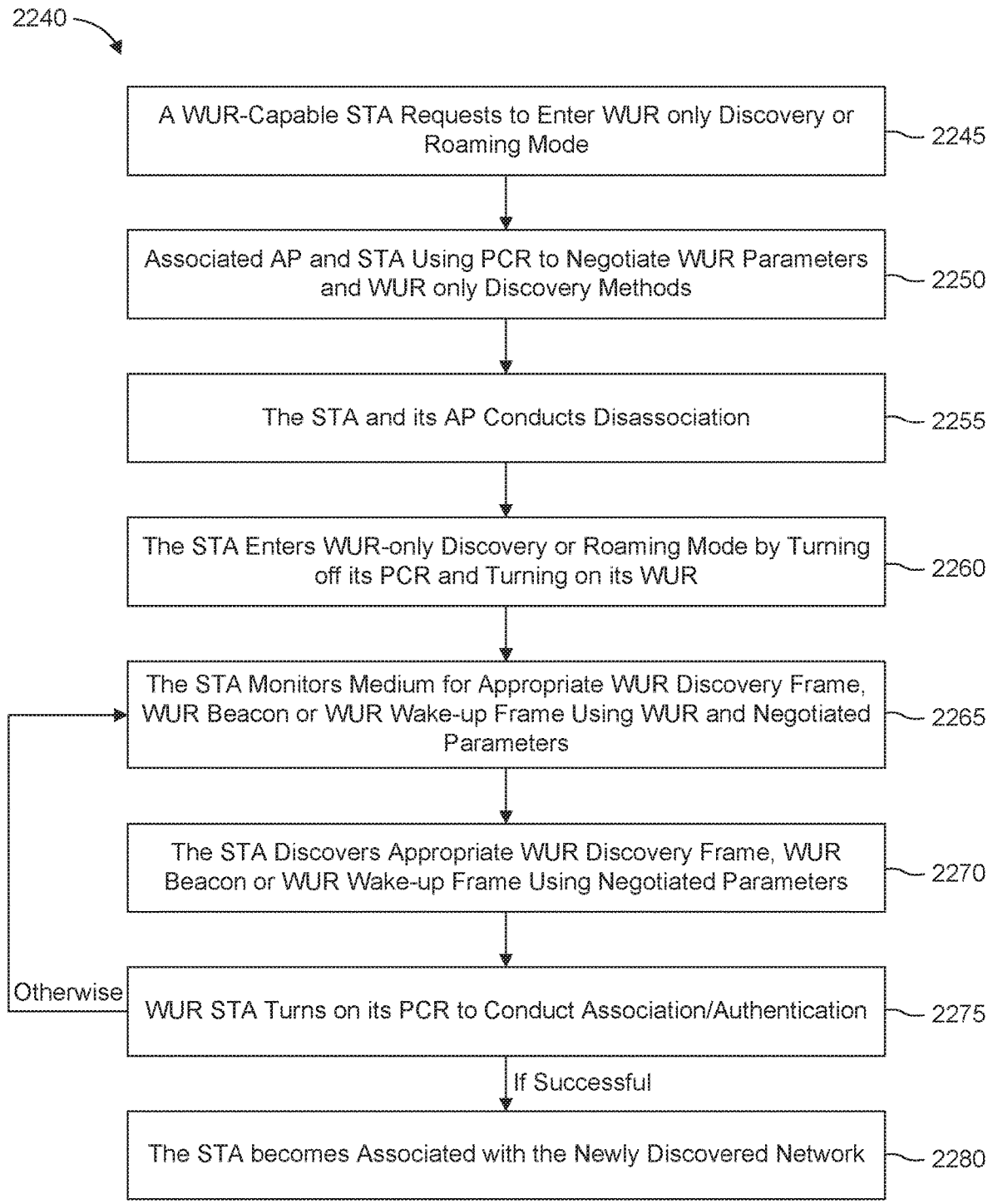
FIG. 22B is a diagram illustrating an example procedure for WUR only discovery mode that may have corresponding state transitions illustrated in FIG. 22A.

FIG. 22A illustrates an example state transition 2200 of a STA for WUR only discovery mode, which may be used in combination with any of other embodiments described herein. FIG. 22B illustrating an example procedure 2240 for WUR only discovery mode that may have corresponding state transitions illustrated in FIG. 22A, which may be used in combination with any of other embodiments described herein. Assuming that a STA is initially or already associated with an AP (i.e. associated state 2235 in FIG. 22A), the STA may transmit, via the PCR, a request frame to the AP to indicate that the STA is to enter WUR only discovery mode when the STA is disassociated from the AP at step 2245 in FIG. 22B. This request frame may be a roaming request frame, a probe request frame, or any type of management, control, or action frames indicating that when the STA is disassociated from the AP, the STA is to enter the WUR only discovery mode to monitor one or more WUR frames from neighbor WUR APs. In this associated state 2235, the associated AP and the STA may further negotiate WUR parameters (e.g., WUR channels or WUR discovery channels) and WUR only discovery method (e.g., WUR beacon frame, WUR discovery frame, WUR wake-up frame, or WUR vendor specific frame) using the PCR transceiver at step 2250. Specifically, the associated AP may transmit, to the STA, a response frame that includes the WUR parameters and WUR only discovery method to be used when the STA is in the WUR only discovery mode. The response frame may be a roaming response frame or any type of management, control, or action frames such as a beacon frame or a probe response frames that include WUR parameters, WUR only discovery methods, or WUR information of target/neighboring BSSs/APs as described above. In this associated state 2235, the WUR transceiver of the STA may be turned on (i.e. activated) or turned off (i.e. deactivated). The terms WUR only discovery mode, WUR only discovery state and roaming mode may be interchangeably used throughout this disclosure.

At step 2240 in FIG. 22A or step 2255 in FIG. 22B, the STA and the associated AP may conduct disassociation or configuration of disassociation each other. The disassociation can occur from both the STA and the associated AP. For example, either the STA or the associated AP may transmit disassociation request as the STA roams to another BSS. Once the STA and the AP are disassociated at step 2255, the STA may enter WUR only discovery mode 2205 or roaming mode by turning off (or deactivating) its PCR transceiver and turning on (or activating) its WUR transceiver at step 2260. In the WUR only discover mode 2205, the STA may monitor the medium for appropriate WUR frames such as a WUR discovery frame, WUR beacon frame, a WUR wake-up frame, or a WUR vendor specific frame using the WUR transceiver at step 2265. In order to monitor the medium for the appropriate WUR frames, the STA may use the negotiated parameters such as the WUR parameters, WUR only discovery methods, or WUR information of neighboring BSSs/APs as described above.

At step 2210 in FIG. 22A or step 2270 in FIG. 22B, the STA may receive, via the WUR transceiver, appropriate WUR frames such as a WUR discovery frame, WUR beacon frame, a WUR wake-up frame, or a WUR vendor specific frame using the negotiated parameters. For example, if the WUR only discovery method indicates the WUR discovery frame as the wake-up method, the STA may monitor, via the WUR transceiver, one or more WUR discovery channels identified in the WUR parameters or WUR information of target BSSs/APs. Similarly, if the WUR only discovery method indicates the WUR beacon frame as the wake-up method, the STA may monitor, via the WUR transceiver, one or more WUR channels identified in the WUR parameters or WUR information of neighboring BSSs/APs. If the WUR only discovery method indicates the WUR wake-up frame as the wake-up method, the STA may monitor, via the WUR transceiver, one or more WUR channels identified in the WUR parameters or WUR information of neighboring BSSs/APs. If the WUR only discovery method indicates the WUR vendor specific frame as the wake-up method, the STA may monitor, via the WUR transceiver, one or more WUR channels identified in the WUR parameters or WUR information of neighboring BSSs/APs.

Figure 23:
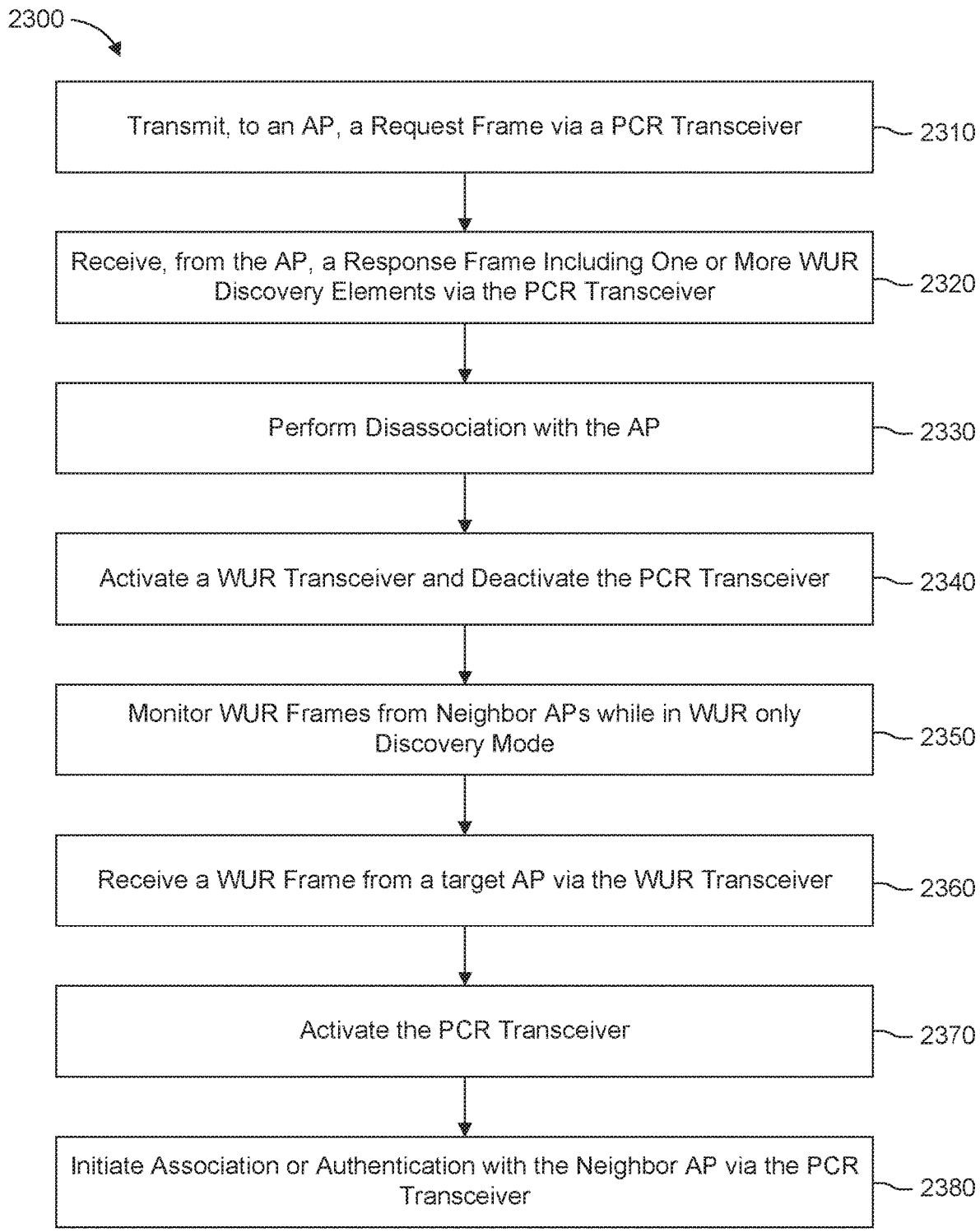
FIG. 23 is a diagram illustrating another example procedure for WUR only discovery mode.

Once the STA receives the suitable WUR frames from a neighboring BSS/AP at steps 2210 and 2270, the STA may enter the WUR and PCR discovery mode 2220 by turning on (or activating) its PCR transceiver at step 2275. While the STA is in the WUR and PCR discovery mode 2220, the STA may initiate association and/or authentication procedures with the neighboring BSS/AP that transmitted the WUR frame. If the association and/or authentication is not successful at step 2215, the STA may return to the WUR only discovery mode 2205. If the association and/or authentication is successful at step 2225, the STA may become associated with the newly discovery network (i.e. neighboring BSS/AP) at step 2280, thereby entering the associated state 2235. In this associated state 2235, the WUR and PCR transceivers may be turned on (or activated). At step 2230, if the STA or AP decides that they want to deauthenticate or disassociate, the STA may enter the WUR and PCR discover mode 2220. The STA may enter or return to the WUR only discovery mode 2205 or roaming mode at step 2240 after the STA and the AP conduct negotiation to enter WUR only discovery mode or roaming mode (i.e. configuration/disassociation). This means that when the STA or the AP wants to conduct roaming in the associated state 2235, the STA or the AP may enter the WUR only discovery mode after the configuration/disassociation, FIG. 23 illustrates another example procedure 2300 for WUR only discovery mode, which may be used in combination with any of other embodiments described herein. For example, assuming that the first AP is initially or already associated with a WTRU, at step 2310, the WTRU (or WUR STA) may transmit, to the first AP, via a first transceiver (i.e. PCR), a request frame indicating that the WTRU will enter WUR only discovery mode or roaming mode when the WTRU is disassociated from the first AP. The roaming request frame may be a management frame, a control frame, an action frame, or any type of frames that is transmitted via the first transceiver to negotiate WUR parameters or WUR information of second BSSs/APs (i.e. target BSSs/APs).

At step 2320, the WTRU may receive, from the first AP, via the first transceiver, a response frame that has one or more WUR discovery elements or target AP information. The response frame may be a management frame, control frame, action frame, or any type of frames that includes one or more WUR discovery elements or target AP information. Examples of the response frame may include, but are not limited to, a beacon frame, an association response frame, a reassociation response frame, and a probe response frame. The WUR discovery element or the target AP information in the response frame may be used to advertise the WUR discovery channels on which WUR APs including the first and second APs transmit WUR discovery frames. The WUR discovery element or the target AP information may include an element ID field, a length field, an element ID extension field, and a WUR AP information set field. The WUR AP information set field may further include one or more WUR AP information subfields such as WUR discovery operating class, WUR discover channel, WUR AP count, and WUR AP list. Each of the WUR AP information subfields may identify the WUR APs including the first and second AP that transmit WUR discovery frames on a particular WUR discovery channel. For example, the WUR AP information subfield may comprise WUR discovery operating class field, WUR discovery channel field, WUR AP list field or the like. The WUR discovery operating class field may indicate the operating class in use for transmission of WUR frames by the WUR APs listed in this subfield. The WUR discovery channel field may indicate the channel in use for transmission of WUR discovery frames by the WUR APs listed in this subfield. The WUR AP list field may include one or more WUR AP parameters subfields. Each WUR AP parameters subfield may identify one WUR AP, which may be the first AP transmitting the WUR discovery element itself or may be a second AP (i.e. target WUR AP). It is noted that the WTRU may receive the response frame from the first AP without transmitting the request frame to the first AP.

Once the WTRU performs disassociation from the first AP at step 2330, the WTRU may activate a second transceiver (i.e. WUR transceiver) and deactivate the first transceiver (i.e. PCR transceiver) at step 2340. The WTRU may enter the WUR only discovery mode after the second transceiver is activated and the first transceiver is deactivated. The WTRU may also enter the WUR only discovery mode from the WUR mode after the second transceiver is activated and the first transceiver is deactivated. At step 2350, the WTRU may monitor WUR frames frame neighbor APs including the second or target AP while in the WUR only discovery mode. At step 2360, the WTRU may receive, from the second AP (i.e. target AP), a WUR frame based on the WUR discovery element or the target AP information. Specifically, the WTRU may receive the WUR frame over the WUR discover channel or the WUR channel specified in the WUR discovery element or the target AP information. If the WTRU determines that the second AP is the AP with which the WTRU may associate, the WTRU may activate (or turn on) the first transceiver (i.e. PCR transceiver) at step 2370 to send an association request frame to the second AP via the first transceiver at step 2380.

The WUR frame received from the second AP (i.e. target AP) at step 2360 may be a WUR discovery frame, a WUR beacon frame, a WUR wake-up frame, or a WUR vendor specific frame. Specifically, if the WUR frame is the WUR discovery frame, the WTRU may monitor the WUR discovery frame over the WUR discovery channel specified in the WUR discovery element. If the WUR frame is the WUR beacon frame, the WTRU may monitor the WUR beacon frame over the WUR channel specified in the WUR discovery element. If the WUR frame is the WUR wake-up frame, the WTRU may monitor the WUR wake-up frame over the WUR channel specified in the WUR discovery element. If the WUR frame is the WUR vendor specific frame, the WTRU may monitor the WUR vendor specific frame over the WUR channel specified in the WUR discovery element.

Figure 24:
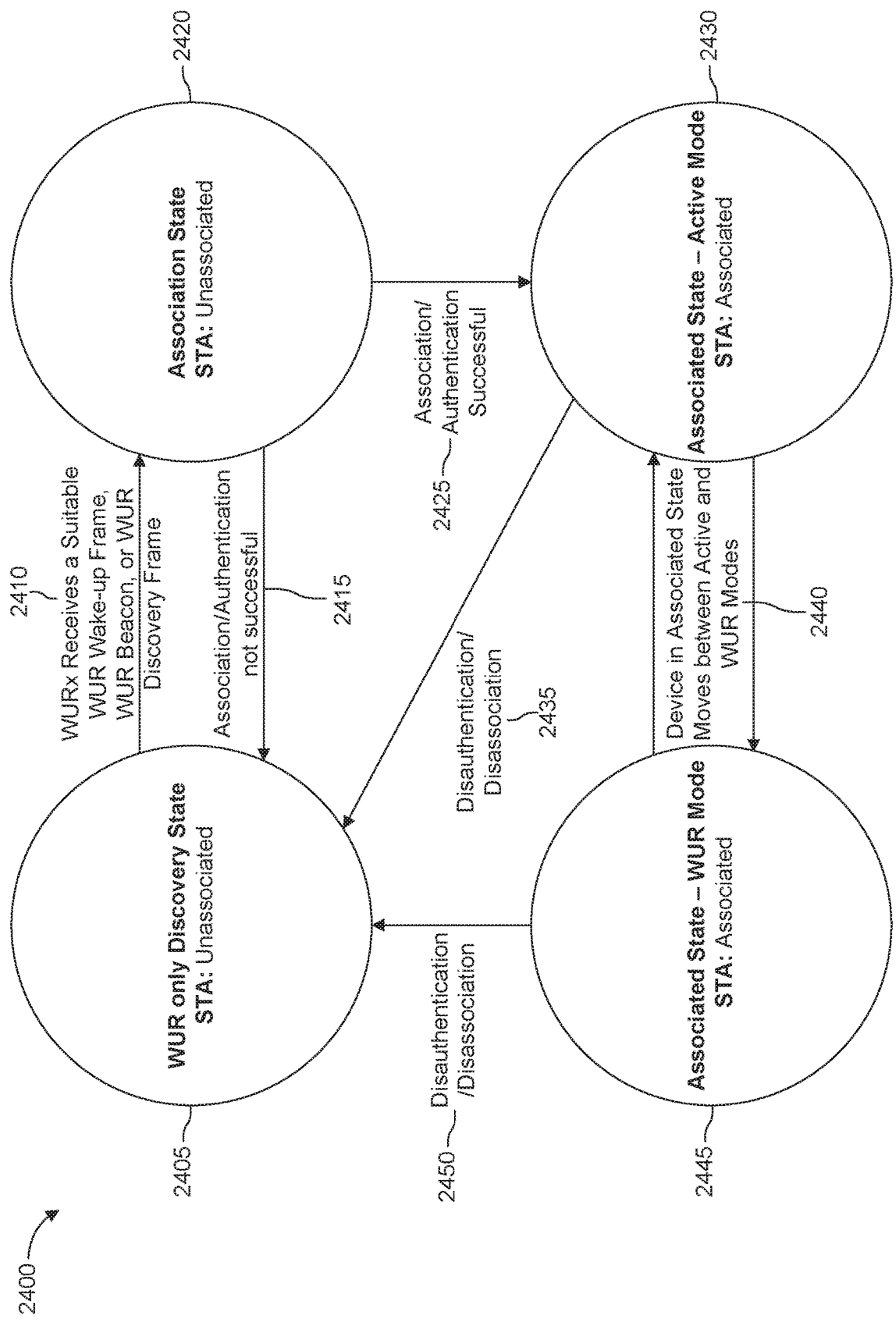
FIG. 24 is a diagram illustrating another example state transition for WUR only discovery mode.

FIG. 24 illustrates another example state transition 2400 for WUR only discovery mode, which may be used in combination with any of other embodiments described herein. In this example, assuming that a non-AP STA equipped with a PCR transceiver and a WUR transceiver is initially or already associated with an AP, the non-AP STA may be in an associated state in WUR mode 2445 or associated state in active mode 2430. In the associated state in WUR mode 2445, the PCR transceiver of the STA may be in a doze, sleep, or unpowered state but the WUR transceiver of the STA may be turned on or in duty cycle mode to monitor WUR frames or WUR packets. In the associated state in active mode 2430, the WUR transceiver of the STA may be in any state (e.g., on, off, or in duty cycle) and the PCR transceiver of the STA may be turned on or in an active state to communicate with the AP associated with the STA. The STA in the associated states 2430, 2445 may move between the active mode 2430 and the WUR mode 2445 based on its communication needs and energy conservation. The STA in the associated states in WUR mode 2445 and active mode 2430 may also move to the WUR only discovery state 2405 based on the disassociation or deauthentication 2435, 2450 occurred between the STA and the AP that is initially associated with the STA.

In the WUR only discovery state 2405, the WUR transceiver of the STA may be on or in duty cycle mode and the PCR transceiver of the STA may be in a doze, sleep, or unpowered state to conserve energy. The STA in this WUR only discovery state 2405 may be unassociated with any AP, and the STA may use the WUR transceiver to receive WUR frames that indicate the availability of a suitable network (e.g., AP, BSS SS, or ESS) for the STA to associate with. At step 2410, when the STA receives, via the WUR transceiver, a WUR frame from the suitable network (e.g., neighboring AP, BSS, SS, or ESS) the STA may notify the device of the discovered network (e.g., AP, BSS, SS, or ESS) to initiate association or authentication with the device. The WUR frame received from the discovered network which may include a unicast/broadcast WUR wake-up frame, WUR beacon frame, WUR discovery frame, WUR vendor specific frame, or any type of frames that includes WUR information about the neighboring networks (e.g., WUR information element and WUR discovery element).

Once a suitable network (e.g., AP, BSS, SS or ESS) has been discovered by the WUR transceiver at step 2410, the STA may move into the association state 2420, where the STA turns on (or activate) its PCR transceiver to exchange frames with the network to enable association or authentication. In this association state 2420, the WUR transceiver of the STA may be on or in duty cycle mode and the PCR transceiver of the STA may be in active mode. The STA may then use its PCR transceiver to conduct authentication and/or association with the desired network. Once the association or authentication is established (i.e. successful) between the STA and the desired network (e.g., AP, BSS, SS, or ESS) at step 2425, the STA and the network may negotiate WUR services (e.g., WUR mode, WUR mode suspend, and the WUR parameters such as WUR channel, WUR duty cycle, WUR discovery channel, or the like). The STA may then operate using its PCR transceiver and/or WUR transceiver to conduct normal (i.e., active), power saving or WUR operations, moving between the associated state in WUR mode 2445 and the associated state in active mode 2430 as agreed to during the WUR service negotiation. If the association or authentication is not established (i.e. unsuccessful) between the STA and the desired network (e.g., AP, BSS, SS, or ESS) at step 2415, the STA may return to the WUR only discovery state 2405 to monitor WUR frames from neighboring networks (e.g., AP, BSS, SS or ESS).

In one embodiment, a device (e.g., WUR STA) may enter WUR only discovery mode at the device's request. The STA may decide or be configured to start the WUR only discovery mode. Such a STA may turn on its PCR transceiver in the presence of a WUR AP or a device that was sending WUR frames.

A STA may also request to enter roaming mode which relies on the WUR only discovery mode, when it is associated with an AP. The STA may send a roaming request to its AP using its PCR transceiver. The roaming request frame may include, but are not limited to: sever address; STA ID and/or STA WUR ID; target SS/BSS/ESS/AP ID; target roaming location; WUR duty cycle parameter; WUR channel; WUR only discovery mode (or capability); and/or wake-up method.

The server address may the address of the server where the information about the STA that may operate in WUR only discovery mode and the WUR parameters (e.g., WUR channel, WUR duty cycle, etc.) may be sent to. It may also be the address or identifier of an authority that will store the configuration for one or more STAs in WUR only discovery modes, or for one or more manufacturers.

The STA ID/STA WUR ID may be the ID of the STA or the WUR ID that can be used to identify the WUR of the STA when operating in the WUR only discovery mode.

The target SS/BSS/ESS/AP ID may be the ID of the target SS/BSS/ESS/AP that the STA desires to roam. The ID may be a BSSID, SSID, ESSID, HESSID or any other type of IDs (e.g., the compressed SSID) that is included in a WUR discovery frame, a TXID used in a WUR frame, or a BSSID or compressed SSID that used to encode the WUR frame.

The target roaming location may be the location for the target roaming area.

The WUR duty cycle parameter may be where the WUR duty cycle parameter is indicated.

The WUR channel(s) may be one or more WUR channels that the STA will monitor using its WUR transceiver.

The WUR only discovery mode (or capability) may be a field that indicates whether the STA will be or can be in WUR only discovery mode.

The wake-up method may be used in a broadcast/multicast/unicast wake-up frame, wake-up beacon frames, wake-up discovery frames, WUR vendor specific frames, or any other wake-up frame and/or the associated organizationally unique identifier (OUI), wake-up ID, or protection.

When the AP receives the roaming request, it may acknowledge the roaming request and then respond with a roaming response frame. Alternatively or additionally, the AP may respond directly with a roaming response. The roaming response frame may be a beacon frame or probe response frame. The roaming response frame may contain information, such as: result(s); configuration result(s); WUR duty cycle parameter; target SS/BSS/ESS/HESS/AP ID; WUR discovery channel(s); WUR channel(s); wake-up ID; wake-up method; and/or WUR discovery mode. In an example, the roaming response frame may also include the WUR discovery element as described above.

The result information may be an indication of whether the roaming request was accepted, rejected, or the like.

The configuration results may be an indication of the configuration with a server, or some configuration authority is successful or not, such as successful, unsuccessful, and the like.

The WUR duty cycle parameter may be used by the WUR STAs in WUR only discovery mode, or in other modes.

The target SS/BSS/ESS/HESS/AP ID may be a field that includes the IDs of the target SS, BSS, ESS, HSS, or AP (e.g., the compressed SSID) which may be included in a WUR discovery frame. The SS/BSS/ESS/HESS/AP may be in the target roaming location indicated by the STA. This field may also indicate a BSSID that may be used in the BSS field to encode the wake-up frames, but may not be included in the wake-up frames. This field may also include the TXID that may be included in the wake-up frames to wake up the STA or to advertise suitable network/APs.

The WUR discovery channel(s) may be the channels that the STA may monitor for WUR only discovery mode. The WUR discovery channels may be associated with the target SS/BSS/ESS/HESS/AP or target roaming location.

The WUR channel(s) may be the WUR channels that the STA may monitor for WUR operations such as WUR only discovery mode and WUR mode. The WUR channels may be associated with the target SS/BSS/ESS/HESS/AP or a target roaming location.

The wake-up ID may be the ID that is used to wake up the STA in the WUR discovery mode.

The wake-up method may use broadcast/multicast/unicast wake-up frame, wake-up beacon frames, wake-up discovery frames, or WUR vendor specific frames, and/or the associated OUI, wake-up ID, or protection.

The WUR discovery mode (or capability) may indicate whether the STA should or can be in the WUR only discovery mode while roaming.

In one embodiment, a non-AP STA associated with an AP may enter a WUR only discovery mode at the AP's request. For example, an AP may send a roaming request or a roaming setup frame to a non-AP STA. The non-AP STA may be associated the AP and has capability of using WUR and PCR transceivers. The AP may include in the roaming request or roaming setup frame information such as: WUR duty cycle parameter; target SS/BSS/ESS/HESS/AP ID; WUR discovery channel(s); WUR channel(s); wake-up ID; wake-up method; and/or WUR discovery mode. In an example, the roaming request or roaming setup frame may also include the WUR discovery element as described above.

The WUR duty cycle parameter may be used by the WUR STAs in WUR only discovery mode, or in other modes.

The target SS/BSS/ESS/HESS/AP ID may be a field that includes the IDs of the target SS, BSS, ESS, HSS, or AP (e.g., the compressed SSID) which may be included in a WUR discovery frame. The SS/BSS/ESS/HESS/AP may be in the target roaming location indicated by the STA. This field may also indicate a BSSID that may be used in the BSS field to encode the wake-up frames, but may not be included in the wake-up frames. This field may also include the TXID that may be included in the wake-up frames to wake up the STA or to advertise suitable network/APs.

The WUR discovery channel(s) may be the channels that the STA may monitor for WUR only discovery mode. The WUR discovery channels may be associated with the target SS/BSS/ESS/HESS/AP or target roaming location.

The WUR channel(s) may be the WUR channels that the STA may monitor for WUR operations such as WUR only discovery mode or WUR mode. The WUR channels may be associated with the target SS/BSS/ESS/HESS/AP or a target roaming location.

The wake-up ID may be the ID that is used to wake up the STA in the WUR only discovery mode.

The wake-up method may use broadcast/multicast/unicast wake-up frame, wake-up beacon frames, wake-up discovery frames, or WUR vendor specific frames, and/or the associated OUI, wake-up ID, or protection.

The WUR only discovery mode (or capability) may indicate whether the STA should or can be in the WUR only discovery mode while roaming.

When the STA receives the roaming request frame from the AP, it may acknowledge the roaming request and then respond with a roaming response frame. Alternatively or additionally, the STA may respond directly with a roaming response. The roaming response may include information such as: result; configuration results; WUR duty cycle parameter; target SS/BSS/ESS/HESS/AP ID; WUR discovery channel(s); WUR channel(s); wake-up ID; wake-up method; and/or WUR only discovery mode.

The result information may be an indication of whether the roaming request was accepted, rejected, or the like.

The configuration results may be an indication of the configuration with a server, or some configuration authority is successful or not, such as successful, unsuccessful, and the like.

The WUR duty cycle parameter may be used by the WUR STAs in WUR only discovery mode, or in other modes.

The target SS/BSS/ESS/HESS/AP ID may be a field that includes the IDs of the target SS, BSS, ESS, HSS, or AP (e.g., the compressed SSID) which may be included in a WUR discovery frame. The SS/BSS/ESS/HESS/AP may be in the target roaming location indicated by the STA. This field may also indicate a BSSID that may be used in the BSS field to encode the wake-up frames, but may not be included in the wake-up frames. This field may also include the TXID that may be included in the wake-up frames to wake up the STA or to advertise suitable network/APs.

The WUR discovery channel(s) may be the channels that the STA may monitor for WUR only discovery mode. The WUR discovery channels may be associated with the target SS/BSS/ESS/HESS/AP or target roaming location.

The WUR channel(s) may be the WUR channels that the STA may monitor for WUR operations such as WUR only discovery mode or WUR mode. The WUR channels may be associated with the target SS/BSS/ESS/HESS/AP or a target roaming location.

The wake-up ID may be the ID that is used to wake up the STA in the WUR only discovery mode.

The wake-up method may use broadcast/multicast/unicast wake-up frame, wake-up beacon frames, wake-up discovery frames, or WUR vendor specific frames, and/or the associated OUI, wake-up ID, or protection.

The WUR discovery mode (or capability) may indicate whether the STA should be or can be in the WUR only discovery mode while roaming.

If the STA transmits the roaming response as described above, it may imply that the STA will disassociate from the AP and/or go into the WUR only discovery mode after the STA is disassociated from the AP. Alternatively or additionally, the STA may send a notification or request to the AP that it may go into the WUR only discovery mode, for example, in a WUR mode setup frame. The AP may then respond with a WUR mode setup frame. The STA may then go into the WUR only discovery mode. The STA may disassociate from the AP before or after the STA sends a WUR setup frame requesting to enter the WUR only discovery mode. Alternatively or additionally, the AP may send a frame which causes the associated STA to send a request to enter roaming mode. Once the STA sends the request to enter the roaming mode, the STA may follow the procedures described above when a STA enters WUR only discovery mode at the device's (i.e. non-AP STA's) request.

In one embodiment, a WUR discovery frame and/or beacon frame may be may be used to discover a suitable network (e.g., SS, BSS, ESS, HSS, or AP). For example, when a STA is in the WUR only discovery mode, and if the wake-up method to be used indicates a WUR discovery frame, the WUR transceiver of the STA may monitor one or more WUR discovery channel(s) for one or more suitable BSS/SS/ESS/HESS/AP IDs. The STA may discover a suitable compressed BSSID, SSID, or any other type of ID, where such information may be included in the WUR mode setup frame or roaming request/response frame exchange with a previously associated AP or be configured through firmware or software.

When a STA is in the WUR only discovery mode, and if the wake up method to be used indicates a WUR beacon frame, then the STA may monitor one or more WUR channel(s) for one or more suitable BSS/SS/ESS/HESS/AP IDs. The STA may discover a suitable TXID, SSID, or any other type of ID, as well as the correct BSSID field. Such information may be included in the WUR mode setup frame or roaming request/response frame exchange with a previously associated AP or be configured through firmware or software.

In another embodiment, WUR wake-up packets or WUR wake-up frames may be used to discover a suitable network (e.g., SS, BSS, ESS, HSS, or AP). For example, when a STA is in the WUR only discovery mode, and if the wake-up method to be used indicates a WUR wake-up frame, the STA may monitor one or more WUR channel(s) for one or more suitable BSS/SS/ESS/HESS/AP. The AP may periodically transmit a WUR wake-up frame after some form of activation, such as when the configuration with a configuration authority is done. The WUR wake-up frame may include, but is not limed to, the wake-up ID, and target BSSID. The STA may discover a correct WUR wake-up frame by using the wake-up ID and/or target BSSID or compressed BSSID. Such information may be included in the WUR mode setup frame, roaming request/response frame exchange with a previously associated AP, or be configured through firmware or software.

In yet another embodiment, a WUR vendor specific frame may be used to discover a suitable network (e.g., SS, BSS, ESS, HSS, or AP). For example, when a STA is in the WUR only discovery mode, and if the wake-up method to be used indicates a WUR vendor specific frame, the WUR transceiver of the STA may monitor one or more WUR channel(s) for one or more suitable WUR vendor specific frames. The AP may periodically transmit a WUR vendor specific frame to wake up the STA after some form of activation, such as when the configuration with a configuration authority is done. The vendor specific frame may include, but is not limited to, the vendor specific OUI, wake-up ID, target/embedded BSSID, and/or the like. The WUR transceiver of the STA may discover a correct WUR vendor specific frame by using the wake-up ID, target/embedded BSSID or compressed BSSID, and/or target vendor specific OUI. Such information may be included in the WUR mode setup frame or roaming request/response frame exchange with a previously associated AP, or be configured through firmware or software.

Figure 25:
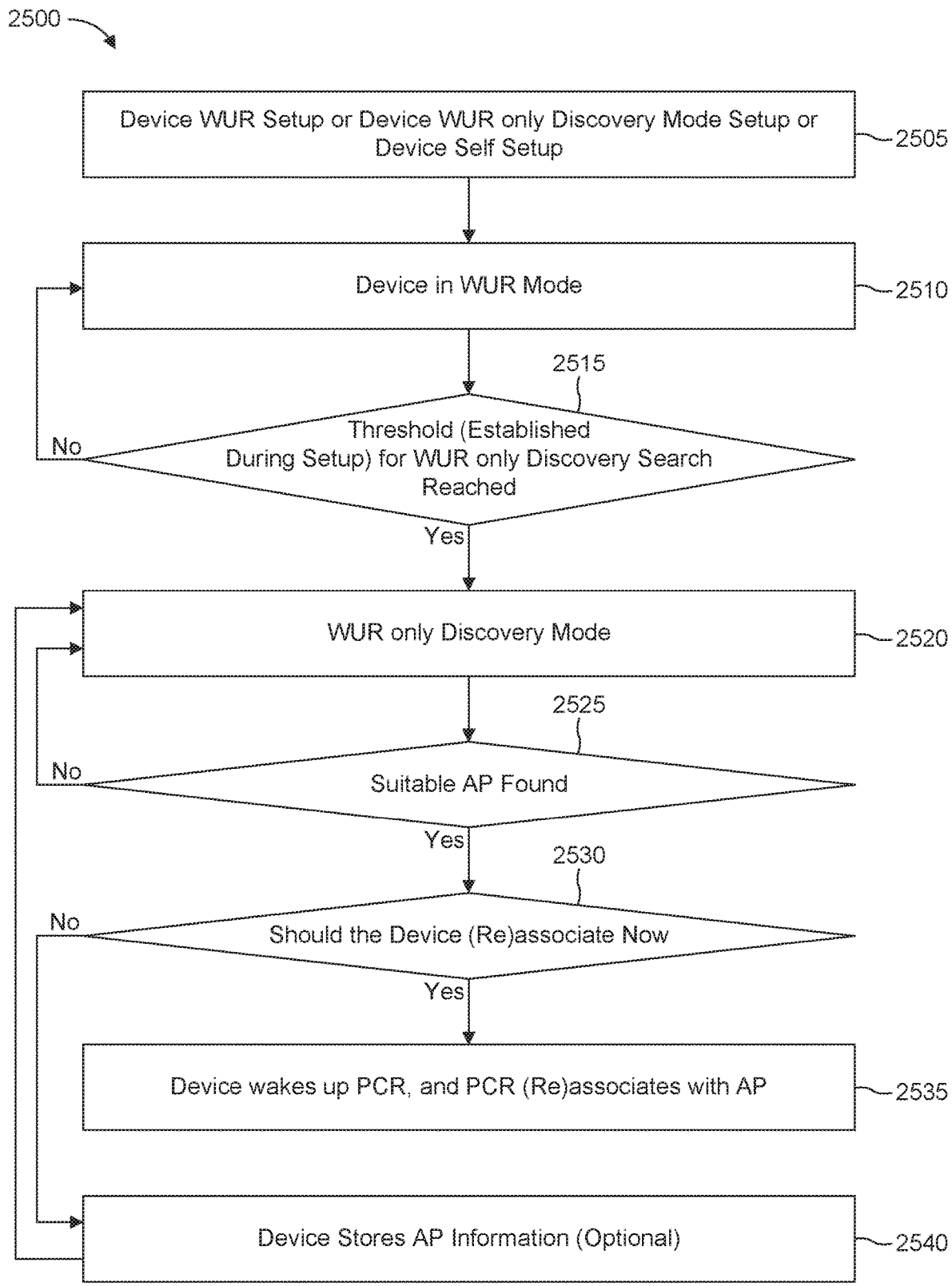
FIG. 25 is a diagram illustrating an example roaming procedure where a station (STA) switches from WUR mode to WUR only discovery mode.

FIG. 25 illustrates an example roaming procedure 2500 where a STA switches from WUR mode to WUR only discovery mode, which may be used in combination with any of other embodiments described herein. At step 2505, a non-AP STA may have been configured during WUR only discovery mode setup, WUR setup, or may have configured itself to monitor WUR beacons and other frames to verify whether the AP to which the STA is trying to associate is active and available (e.g., from the STA's current location). Once the STA's WUR setup, WUR only discovery mode setup or self-setup is completed, the STA may enter into WUR mode at step 2510. Various thresholds established during the setup period may be used to determine whether the AP with which the STA is associated is available or not. These thresholds may be based on the time between received WUR frames from the associated AP, signal strength of WUR frames form the associated AP, or types of WUR frames received. Also, these thresholds may be established based on relative frequency and/or strength of the WUR frames received from the associated AP and/or the frames received from other known AP (i.e. APs provided to the STA during WUR only discovery mode setup, WUR setup, or known to the STA from past discovery activity including both WUR only discovery and/or PRC discovery).

If the STA detects that a threshold has been reached and the current associated AP and/or other known APs are not active and/or available at step 2515, the STA may then switch from the WUR mode to WUR only discovery mode at step 2520 to attempt to find other suitable networks (e.g., APs) to associate with. For example, a list of suitable APs may have been provided to the STA as part of the WUR only discovery mode setup as described above. The decision of when the device associates or re-associates with a suitable discovered AP may be configured during WUR only discovery mode setup, WUR setup, or can be decided by the STA based on internal device setting or device triggers. Once the STA finds a suitable AP at step 2525, the STA may determine whether the STA should associate the discovered AP at step 2530. If the STA determines that the STA needs to associate with the discovered AP at step 2530, the STA may wake up the PCR transceiver at step 2535 to initiate association with the discovered AP. If the STA determines that the STA needs not to associate with the discovered AP at step 2530, the STA may store the AP information on its hardware or in the list of unsuitable APs at step 2540. The STA may then return to the WUR only discovery mode at step 2520 to find other neighboring APs that the STA can associate with.

Figure 26:
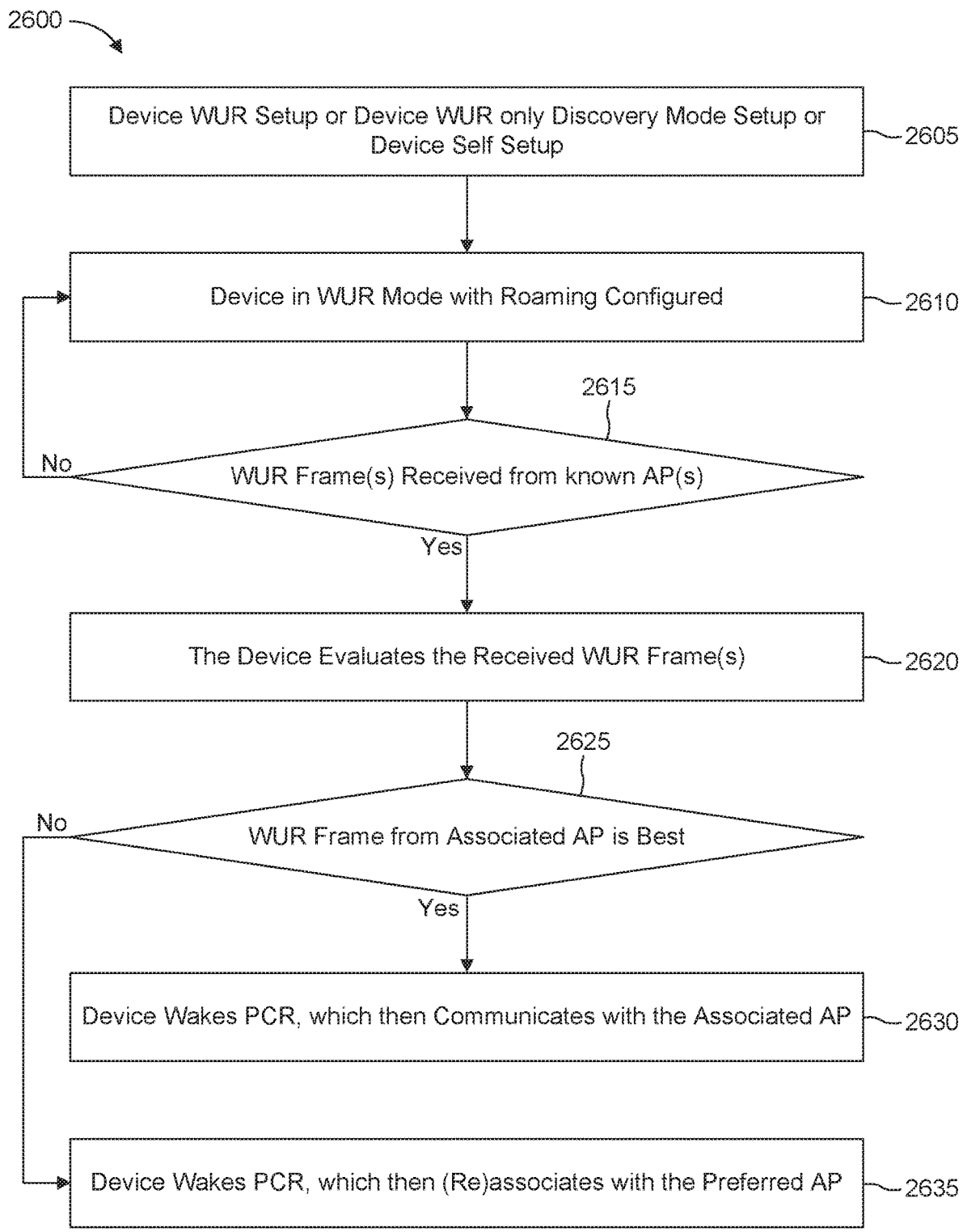
FIG. 26 is a diagram illustrating an example roaming procedure where a STA is in WUR mode.

FIG. 26 illustrates an example roaming procedure 2600 where a STA is in WUR mode, which may be used in combination with any of other embodiments described herein in WUR mode. In one embodiment, a STA's roaming in WUR mode may allow the STA with a WUR transceiver to roam throughout a defined roaming area, ESS, or HESS without turning on its PCR. The defined roaming area, ESS, or HESS may be configured such that WUR wake-up frames for the STA may be sent by all the APs in the defined roaming area, ESS, or HESS. Upon receiving such a WUR frame, the STA may know which AP the STA needs to (re)associate with when the WUR frame wakes up its PCR transceiver. In this example, the STA's wake-up ID and/or wake-up purpose ID may be unique to the STA in the defined roaming area, ESS, or HESS. These IDs may also be shared by all APs in the defined roaming area, ESS, or HESS. In addition, WUR group IDs may be defined for the roaming area, ESS, or HESS and all STAs in the group may be informed of the ID. All APs in the defined roaming area, ESS, or HESS may be aware of all the members in the group. Therefore, a STA with a WUR transceiver receiving a WUR frame with a known ID may use the WUR ID and the AP ID to gain the information that it needs to know when to wake up its PCR transceiver and then (re)associate with the AP in the roaming area, ESS, or HESS which has awakened it. This is illustrated in FIG. 26 as the example of the STA roaming in WUR mode.

At step 2605, a non-AP STA may have been configured during WUR only discovery mode setup, WUR setup, or may have configured itself to monitor WUR beacons and other frames to verify whether the AP to which the STA is trying to associate is active and available (e.g., from the STA's current location). Once the STA's WUR setup, WUR only discovery mode setup or self-setup is completed, the STA may enter into WUR mode at step 2610. While the STA is in the WUR mode, the STA may determine that whether one or more WUR frames received at the SAT are from known APs at step 2615. For example, the WUR frames may be received from APs located in the defined roaming area, ESS, or HESS. Once the STA determines that the WUR frames are received from the known APs, the STA may evaluate the received WUR frames at step 2620. For example, the STA may evaluate the WUR parameters in the WUR frames such as wake-up ID, wake-up purpose ID, and WUR group IDs that are defined in the defined roaming area, ESS, or HESS. The STA may also evaluate signal strength of the WUR frames form the known APs or types of the WUR frames received to determine the best WUR frame received from the known APs. If the STA determines that the WUR frame received from the currently associated AP is the best at step 2625, the STA may wakes up its PCR transceiver to communicate the associated AP at step 2630. If the STA determines that the WUR frame received from the currently associated AP is not the best at step 2625, the STA may also wake up its PCR transceiver to (re)associate with the preferred AP at step 2635.

In another embodiment, a field may be added to the WUR frame which contains an originally associated AP(s) ID(s). In this example, although the WUR transceiver's ID, wake-up ID, WUR group IDs, and/or wake-up purpose ID of the STA may not be unique for the defined roaming area, ESS, or HESS, these IDs may only need to be unique for the associated AP. When the STA is receiving the WUR frame, it may check both the WUR ID and the AP's ID to determine if the WUR frame is intended for the STA. If the WUR frame is intended for the STA, then the STA may also be aware of which AP it has received the WUR frame from, and consequently have all the information the STA needs to wake up its PCR and (re)associate with the sending AP. All the APs in the defined roaming area, ESS, or HESS may need to be aware of the WUR IDs, WUR group IDs, and wake-up purpose IDs used by each AP of the APs in the defined roaming area, ESS, or HESS for this embodiment. Communication between APs in the defined roaming area, ESS, or HESS may allow the associated AP to be able to wake up its associated STA via one of other APs in the roaming area, ESS, or HESS, and upon (re)association of the STA, route data or control frames to the STA.

Although the embodiments described herein consider 802.11 specific protocols, it is understood that the embodiments described herein are not restricted to this scenario and are applicable to other wireless systems such as cellular networks, 4G networks, and 5G (or NR) networks as well.

Although SIFS is used to indicate various inter frame spacing in some examples of the embodiments and procedures, all other inter frame spacing such as RIFS or other agreed time interval may be applied in a similar manner.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a device, WTRU, UE, terminal, base station, RNC, or any host computer.

What is claimed is:

1. A method for use in a station (STA), the method comprising:
    receiving, from an access point (AP) that the STA is associated with, a management frame that includes a wake-up radio (WUR) discovery element, wherein the WUR discovery element includes an indication of a plurality of WUR discovery channels comprising a first WUR discovery channel associated with the AP and a second WUR discovery channel associated with another AP that the STA is not associated with;
    receiving, from the AP, a first WUR frame in a WUR physical layer protocol data unit (WUR PPDU) format over the first WUR discovery channel determined based on the WUR discovery element; and
    receiving, from the another AP, a second WUR frame in a WUR PPDU format over the second WUR discovery channel determined based on the WUR discovery element.

2. The method of claim 1, further comprising:
    transmitting, to the AP, a request frame indicating that on a condition that the STA is disassociated from the AP, the STA will enter a WUR only discovery mode to monitor for a WUR frame based on the WUR discovery element.

3. The method of claim 2, wherein the STA enters the WUR only discovery mode after a wake-up radio (WUR) transceiver is activated.

4. The method of claim 1, wherein the management frame is a beacon frame or a probe response frame.

5. The method of claim 1, wherein the first WUR frame or the second WUR frame is a WUR discovery frame, a WUR beacon frame, a WUR wake-up frame, or a WUR vendor specific frame.

6. The method of claim 5, wherein the WUR discovery element in the management frame includes a first WUR operating class of the AP, the first WUR discovery channel of the AP, first WUR parameters of the AP, a second WUR operating class of the another AP, the second WUR discovery channel of the another AP, and second WUR parameters of the another AP.

7. The method of claim 5, further comprising:
    on a condition that the first WUR frame is a first WUR discovery frame, monitoring the first WUR discovery frame over the first WUR discovery channel; and
    on a condition that the second WUR frame is a second WUR discovery frame, monitoring the second WUR discovery frame over the second WUR discovery channel.

8. The method of claim 1, further comprising:
    activating the transceiver to communicate with the AP or the another AP.

9. The method of claim 1, further comprising:
    selecting, based on signal strengths of the first WUR frame and the second WUR frame, the AP or the another AP for further communication with.

10. The method of claim 1, where the another AP is a neighboring AP.

11. A station (STA) comprising:
    a processor; and
    at least one transceiver;
    the processor and the at least one transceiver configured to:
        receive, from an access point (AP) that the STA is associated with, a management frame that includes a wake-up radio (WUR) discovery element, wherein the WUR discovery element includes an indication of a plurality of WUR discovery channels comprising a first WUR discovery channel associated with the AP and a second WUR discovery channel associated with another AP that the STA is not associated with;
        receive, from the AP, a first WUR frame in a WUR physical layer protocol data unit (WUR PPDU) format over the first WUR discovery channel determined based on the WUR discovery element; and
        receive, from the another AP, a second WUR frame in a WUR PPDU format over the second WUR discovery channel determined based on the WUR discovery element.

12. The STA of claim 11, wherein the processor and the at least one transceiver are further configured to transmit, to the AP, a request frame indicating that on a condition that the STA is disassociated from the AP, the STA will enter a WUR only discovery mode to monitor for a WUR frame based on the WUR discovery element.

13. The STA of claim 12, wherein the STA enters the WUR only discovery mode after a WUR transceiver is activated.

14. The STA of claim 11, wherein the management frame is a beacon frame or a probe response frame.

15. The STA of claim 11, wherein the first WUR frame or the second WUR frame is a WUR discovery frame, a WUR beacon frame, a WUR wake-up frame, or a WUR vendor specific frame.

16. The STA of claim 15, wherein the WUR discovery element in the management frame includes a first WUR operating class of the AP, the first WUR discovery channel of the AP, first WUR parameters of the AP, a second WUR operating class of the another AP, the second WUR discovery channel of the another AP, and second WUR parameters of the another AP.

17. The STA of claim 15, wherein the processor is further configured to:
- on a condition that the first WUR frame is a first WUR discovery frame, monitor the first WUR discovery frame over the first WUR discovery channel; and
- on a condition that the second WUR frame is a second WUR discovery frame, monitoring the second WUR discovery frame over the second WUR discovery channel.

18. The STA of claim 11, wherein the processor is further configured to activate the at least one transceiver to communicate with the AP or the another AP.

19. The STA of claim 11, wherein the processor is further configured to select, based on signal strengths of the first WUR frame and the second WUR frame, the AP or the another AP for further communication with.

20. The STA of claim 11, where the another AP is a neighboring AP.

* * * * *